US010332139B2

(12) United States Patent
Lanxner et al.

(10) Patent No.: US 10,332,139 B2
(45) Date of Patent: Jun. 25, 2019

(54) DYNAMIC RE-PRICING OF ITEMS ON ELECTRONIC MARKETPLACES AND/OR ONLINE STORES

(71) Applicant: Feedvisor Ltd., Tel-Aviv (IL)

(72) Inventors: Eyal Lanxner, Modiln (IL); Victor Rosenman, Tel-Aviv (IL)

(73) Assignee: FEEDVISOR LTD., Tel-Aviv (IL)

( * ) Notice: Subject to any disclaimer, the term of this patent is extended or adjusted under 35 U.S.C. 154(b) by 739 days.

(21) Appl. No.: 14/207,909

(22) Filed: Mar. 13, 2014

(65) Prior Publication Data

US 2014/0278804 A1    Sep. 18, 2014

Related U.S. Application Data

(60) Provisional application No. 61/783,397, filed on Mar. 14, 2013.

(51) Int. Cl.
*G06Q 10/00* (2012.01)
*G06Q 30/02* (2012.01)

(52) U.S. Cl.
CPC .............................. *G06Q 30/0206* (2013.01)

(58) Field of Classification Search
CPC .............................. G06Q 10/00; G06Q 30/02
USPC ................................................ 705/7.11–7.42
See application file for complete search history.

(56) References Cited

U.S. PATENT DOCUMENTS

| | | | | |
|---|---|---|---|---|
| 5,873,069 A | * | 2/1999 | Reuhl | G06Q 20/201 235/375 |
| 7,853,473 B2 | * | 12/2010 | Davis | G06Q 10/04 705/1.1 |
| 7,904,346 B2 | * | 3/2011 | Grove | G06Q 30/0601 705/26.1 |
| 8,005,697 B1 | * | 8/2011 | Cohen | G06Q 10/06 705/7.13 |
| 2004/0054634 A1 | * | 3/2004 | Tak | G06Q 30/0283 705/400 |
| 2008/0027827 A1 | * | 1/2008 | Eglen | G06Q 30/00 705/26.8 |
| 2011/0238497 A1 | * | 9/2011 | Milne | G06Q 10/02 705/14.49 |
| 2012/0226585 A1 | * | 9/2012 | Kogan | G06Q 30/0283 705/26.61 |

* cited by examiner

*Primary Examiner* — Robert D Rines
(74) *Attorney, Agent, or Firm* — Browdy and Neimark, P.L.L.C.

(57) ABSTRACT

A method of dynamically re-pricing items, comprising:
 a) Receiving from a seller a sale policy for one or more items offered for sale by one or more plurality of vendors.
 b) Creating a state machine to execute the sale policy by adjusting a price of the one or more items.
 c) Collecting commerce information by monitoring in real time a plurality of prices given to the one or more items by the one or more vendors.
 d) Dynamically adjusting a plurality of price setting rules according to analysis of said commerce information.
 e) Executing the state machine to select one or more of the plurality of price setting rules and modifying the price according to one or more selected price setting rule.

37 Claims, 18 Drawing Sheets

Fig. 17

DYNAMIC RE-PRICING OF ITEMS ON ELECTRONIC MARKETPLACES AND/OR ONLINE STORES

RELATED APPLICATION

This application claims the benefit of priority under 35 USC § 119(e) of U.S. Provisional Patent Application No. 61/783,397 filed Mar. 14, 2013, the contents of which are incorporated herein by reference in their entirety.

BACKGROUND

The present invention, in some embodiments thereof, relates to management of prices of goods and services in electronic marketplaces and/or online stores and, more specifically, but not exclusively, to dynamically re-pricing in real time the goods and services offered on electronic marketplaces and/or online stores.

Electronic commerce (e-Commerce) in general and electronic marketplaces in particular serves as a platform through which third-party merchants (sellers and/or vendors) may offer products and/or services to consumers. The electronic marketplaces may be utilized through on-line systems available to the sellers and the consumers through a plurality of interfaces, for example, client application and/or web browser based service that execute on a one or more of a plurality of client terminals, for example, Smartphone, tablet, work station, desktop computer and/or laptop computer. The electronic marketplaces, for example, Amazon Marketplace, eBay Marketplace and/or Sears Marketplace, provide sellers with access to large consumer traffic for a fee and/or a percentage of the sales made through the electronic marketplace. The marketplace may offer the sellers additional services, for example, billing, shipping and/or advertising.

The electronic marketplaces are highly competitive arenas in which many sellers operate and offer the same item (product and/or service). In case the same item is offered by multiple sellers, the electronic marketplace system automatically orders the presentation of offers from sellers to a potential consumer in a prioritized manner, for example according to the rank of the sellers. Highest ranking offers get to appear higher in a list and therefore get more exposure from offers from other sellers. This exposure increases the chance of winning the deal. In some electronic marketplaces, for example, Amazon Marketplace, the highest ranking offer gets to be selected as the default seller. The default seller, for example, the buy box winner on the Amazon Marketplace, gets to be the one to close the deal when the consumer selects to make a purchase of the offered item, for example, through the "add to cart" option and/or through the "buy it now" option. It is therefore, desired for the sellers to get high ranking for their offer in order to get best exposure which may result in winning many sale transactions and increasing sales and profit.

The set of rules by which the electronic market place system ranks the offers made by the sellers relies on a set of criteria which may be unpublished and/or unknown to the public. The set of criteria may include a plurality of criterion for the product, for example, price, availability, shipping details and/or number of reviews, and/or a plurality of criterion for the seller, for example, sales history, consumers' rating, credibility and/or number of returned items. The criterions may be weighted so as to have different influence of each of the criteria on the ranking of the offers.

The sellers may manipulate the prices of the items they offer for sale in order to increase their sales and/or profits. Reducing the price may result in getting high ranking and higher volume of sales but may also result in loss in profitability. Increasing the price may result in the seller dropping in ranking and probably winning less deals. The optimal price may be set according to a plurality of attributes of the items offered for sale and/or attributes of the sellers. However, the price of the item(s) will typically have the highest immediate impact on the ranking of the offer made by a seller. As the electronic marketplace may be a dynamic place, the prices of an item offered by multiple sellers may vary.

Dynamic pricing of items on electronic marketplaces may be done manually by a seller who is continuously following the trade activity of the item on the electronic marketplace and adjusts the price accordingly. Some solutions may be available in which a seller may define a set of rules by which the price of an item may be adjusted over time. However these solutions usually employ a static set of rules which do not adapt to the changing conditions on the trade of the item. The rules defined in these sets of rules are also usually independent of each other and may not be able to serve a comprehensive sales strategy. Furthermore, some of the electronic marketplaces provide limited access to pricing information of competitor sellers, thus reducing the effectiveness of the static set of rules. In addition the system for ranking the offers of the sellers may not be fully deterministic in order to provide equal opportunity to several sellers by selecting a different default seller for a specific item during consecutive views of the item by consumers.

SUMMARY

According to some embodiments of the present invention, there are provided systems and methods for dynamically re-pricing items by receiving from a seller a sale policy for one or more items offered for sale by one or more vendors, creating a state machine to execute the sale policy by adjusting the price of the one or more items, collecting commerce information by monitoring in real time a plurality of prices given to the one or more items by the one or more vendors, dynamically adjusting a plurality of price setting rules according to analysis of the commerce information and executing the state machine to select one or more of the plurality of price setting rules and modifying the price according to the one or more selected price setting rules.

Optionally, the one or more items are offered for sale by the one or more vendors on an electronic marketplace.

Optionally, the one or more items are offered for sale by the seller on an online store exclusive to the seller.

Optionally, the sale policy includes a traffic strategy to increase overall traffic from one or more traffic generators to an online store hosting the one or more items.

Optionally, the sale policy is translated to a sale strategy which is implemented through the plurality of price setting rules, wherein execution of one or more selected setting rules fulfills the goals of the sale policy.

Optionally, the sale strategy is resolving conflicts between the plurality of price setting rules.

Optionally, modification to the price is performed in a plurality of re-pricing iterations, during each of the re-pricing iteration the commerce information is monitored and analyzed in order to adjust the plurality of price setting rules and execute the one or more selected price setting rules.

Optionally, the commerce information includes previous commerce information of the one or more items collected in the past.

Optionally, the commerce information includes at least one member of a group consisting of: sale transactions of the one or more items, the one or more vendors, prices set by one or more vendors, views of the one or more items, ranking of offer made by the seller, ranking of offers made by the one or more vendors, inventory level, shipping information of the one or more vendors, terms of payment of the one or more vendors, consumers rating of the seller and consumers rating of the one or more vendors.

Optionally, the commerce information includes traffic generated by each of the respective traffic generators, to an online store hosting the one or more items.

Optionally, analysis of the commerce information includes determining a contribution of each of a plurality of traffic generators in producing orders for the one or more items, and wherein dynamically adjusting the plurality of price setting rules comprises dynamically adjusting the plurality of price setting rules to increase overall traffic from the plurality of traffic generators.

Optionally, the sale policy includes a plurality of sale parameters which are defined using a range of values in order to allow flexibility in adjusting the price.

Optionally, the sale policy defines an aggressiveness level which dictates the state machine rapidity in adjusting the price to achieve the goals of the sale policy.

Optionally, the aggressiveness level dictates the extent of statistical analysis required for adjusting the plurality of price setting rules for adjusting the price.

Optionally, the aggressiveness level dictates the amount in units when adjusting the price.

Optionally, the aggressiveness level is adjusted automatically for a limited period to achieve the goals of the sale policy.

Optionally, the commerce information is presented to the seller to enable the seller to analyze the commerce information of the one or more items.

Optionally, the seller manually adjusts one or more of a plurality of price setting rules.

Optionally, extrapolation is performed over a plurality of price levels points adjacent to the price in order to enhance statistical information used by the analysis.

Optionally, priority is set between two or more items offered for sale by the seller. The priority defines the frequency in which the price is set for the two or more items.

Optionally, the analysis includes trade off analysis to evaluate two or more pricing alternatives in order to select a pricing alternative that best achieves goals set by the sale policy.

Optionally, the sale policy is a long term policy, while executing the long term policy one or more intermediate goals is set and fulfilled in order to fulfill the goals of the sale policy.

Optionally, the method further comprises predicting the sale policy, and wherein dynamically adjusting the plurality of price setting rules comprises dynamically adjusting the plurality of price setting rules according to analysis of the prediction of the sale policy.

Optionally, predicting the sale policy is calculated based on a correlation between at least one intermediate metric and the sale policy.

Optionally, the method further comprises calculating one or more intermediate metrics for the one or more items for a selected current or previous time period to estimate a baseline level of the one or more intermediate metrics.

Optionally, the one or more intermediate metrics includes at least one member of a group consisting of: competition for the one or more items, top rank rate of the seller for the one or more items, price of the one or more items, demand denoting popularity and purchase levels of the one or more items, traffic for the one or more items from a respective traffic generator, conversion rates for the one or more items from the respective traffic generator.

Optionally, the method further comprises predicting at least one intermediate metric for the at least one item for a selected future time period.

Optionally, one or more intermediate metrics are calculated for the one or more items offered for sale on a preselected electronic marketplace.

Optionally, the method further comprises calculating a statistical significance level reflecting a probability of predicting the one or more intermediate metrics and/or a probability of the predicting the sale policy.

Optionally, predicting the sale policy comprises predicting one or more metrics associated with the sale policy. Optionally, the one or more metrics associated with the sale policy includes at least one member of a group consisting of: revenue, profit, and margin.

According to some embodiments of the present invention, there are provided systems for dynamically re-pricing items. the system includes an input module which receives from a seller a sale policy for one or more items offered for sale by one or more vendors, a monitor module which collects commerce information by monitoring in real time a plurality of prices given to the one or more items by the one or more vendors, an analysis module which dynamically adjusts a plurality of price setting rules according to analysis of the commerce information and a state machine module which selects one or more of the plurality of price setting rules to adjust a price of the one or more items.

Optionally, the re-pricing system includes an output module which presents the commerce information to the seller for analysis. The commerce information is analyzed by the analysis module to adjust the plurality of price setting rules.

Optionally, the output module presents the plurality of price setting rules to the seller to allow the seller to adjust at least one of the plurality of price setting rules.

Optionally, the input module communicates with the seller having a client terminal executing a client application.

Optionally, the client application is implemented through a web based service which is accessible through the client terminal.

Optionally, the analysis module is further programmed to dynamically adjust a plurality of price setting rules according to analysis of a prediction of the sale policy for the one or more items based on the commerce information. Optionally, prediction of the sale policy is based on correlation with a prediction of one or more intermediate metrics, the intermediate metric includes one or more members of a group consisting of: competition for the one or more items, top rank rate of the seller for the one or more items, price of the one or more items, and demand denoting popularity and purchase levels of the one or more items.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 17 is a screen capture of an exemplary editing screen of an exemplary user interface for inserting an item to an exemplary re-pricing system, according to some embodiment of the present invention.

DETAILED DESCRIPTION

Figure 1:
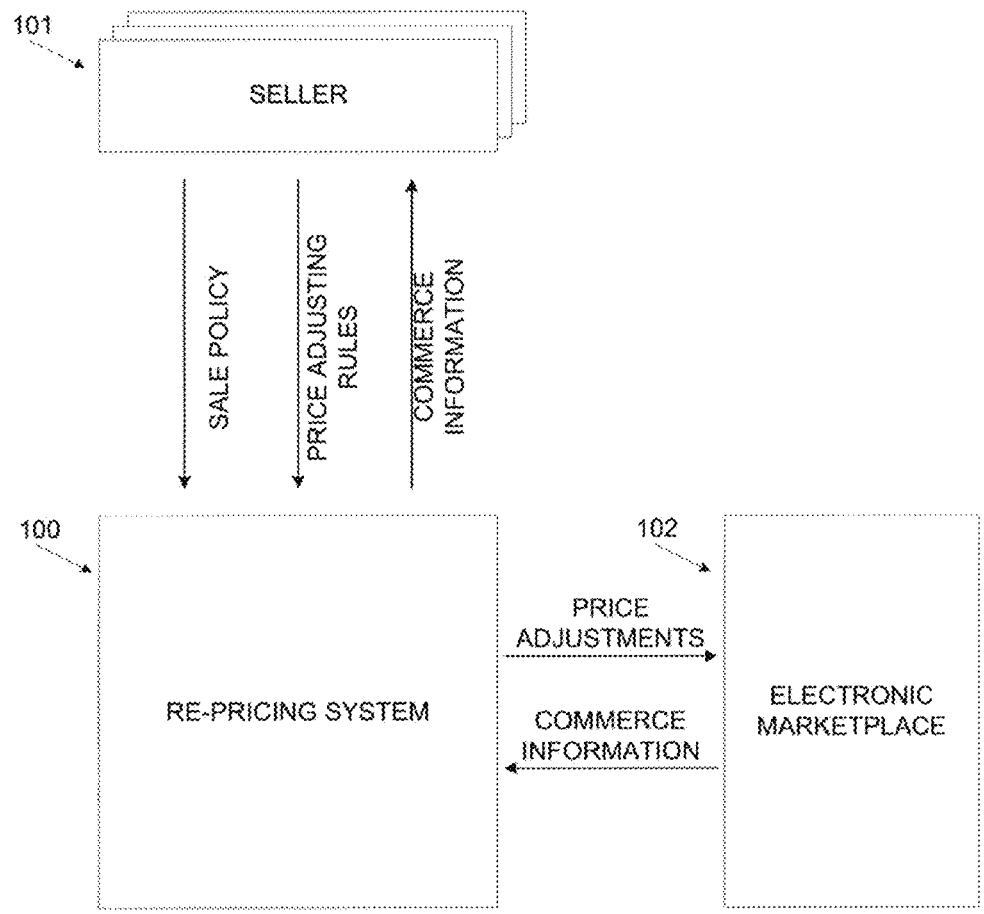
FIG. 1 is a schematic illustration of an exemplary dynamic re-pricing system for dynamically re-pricing one or more items offered for sale on an electronic marketplace, according to some embodiments of the present invention.

The present invention, in some embodiments thereof, relates to management of prices of goods and services on electronic marketplaces and/or online stores and, more specifically, but not exclusively, to dynamically re-pricing the goods and services in real-time.

According to some embodiments of the present invention, there are provided systems and methods for dynamically re-pricing items offered for sale on an electronic marketplace and/or online stores, and/or other types of electronic commerce arenas, for example, a website hosting the items offered for sale. The electronic marketplace may host items for sale by different sellers, for example, a website that presents a user looking for an item with different offers of sale for the item by different sellers. The online store and/or website may be operated by the seller, for example, exclusively offering items for sale by the seller such as an online store owned and operate by the seller. The terms electronic marketplace and/or online stores and/or hosting website are not necessarily limiting, and are meant to cover different models of on-line electronic commerce. For example, a website exclusive to a seller, but offering other different items for sale by different vendors. As described herein, the terms electronic marketplace, online store and website hosting the item are sometimes interchangeable, for example, depending on the context. Alternatively, as described herein, sometimes the terms electronic marketplace, online store and website hosting the item are sometimes not interchangeable. For example, based on the context, the term electronic marketplace may refer to an online arena offering items from different sellers. For example, based on the context, the terms online store and/or website may refer to an online arena offering items from an exclusive seller.

A sale policy which defines sales goals for one or more items offered on the electronic marketplace is received from the seller (user). A state machine is created to execute a plurality of offer adjusting actions which are selected from dynamically adapted rules. The rules are created and/or modified to adjust the price of the one or more items in order to fulfill the goals of the sale policy. The rules are optionally adapted in real time according to offers pertaining to the one or more items offered by different sellers in the electronic marketplace arena, for example, reduce the price of the one or more items compared with one or more offers made by the competitor sellers in order to make the offer more attractive and increase sales volume. The rules are optionally adapted in real time according to a prediction of future values related to the items offered for sale, optionally metrics associated with the sales goals, for example, metrics related to revenue, profits, margins and/or other metrics and/or other goals. Optionally, the goals of the sale policy are achieved by adjusting one or more characteristics of the one or more items other than the price, for example, terms of payment, expedited delivery and/or discount for purchase of large quantity of the one or more items.

Optionally, the optimal price and/or dynamic re-pricing is selected and/or preformed based on one or more of: per seller basis, per product basis, per electronic marketplace basis, per period of time, and/or for other factors.

The seller also provides item information, for example, product cost, inventory and/or shipping costs. The item information may include additional characteristics of the one or more items, for example, cost structure, fee structure and/or profit structure. The cost structure may include, for example, direct and indirect costs of the one or more items. The fee structure may include, for example, a commission transferred to the electronic market place for a sale. The profit structure may include, for example, minimum profit, maximum profit, gain margin and/or markup.

The sale policy may be a high level user defined policy which specifies sale goals, for example, pricing within a pre-defined range, increase in volume of sales, increase in profit, increase in profit margin, maximize profit while maintaining sales volume, maximize volume while within a pre-defined profit margin range, liquidate inventory while minimizing loss, maximize perception (to improve ranking) and/or increase visibility and/or impression on consumers on the electronic marketplace. The scope of the sale policy may be defined, for example, for one or more items, for a line of items, for a category of items and/or for a portfolio of the seller. By defining the high level sale policy the seller is relieved from continuously following the trade and manually adjusting the price of the item(s) the seller offers for sale. The seller may also avoid the need to specify low level pricing rules which may be static and as such may need to be continuously modified to adapt to the changing trade on the electronic marketplace. Moreover, it is impossible to represent high-level user defined policies by low level pricing rules, as the criteria for ranking the offers may not be available from the operator of the electronic marketplace, and as price changes generated by such pricing rules may trigger an unknown response by one or more competitors.

The sale policy is translated by the system to a strategy to be followed in order to achieve the goals set by the sale policy and/or maintains a current state. The strategy is implemented through a set of price setting rules for adjusting the price of the one or more items. The set of price setting rules may include a plurality of rules, each rule may define low level threshold(s), for example a requirement to reduce profit margin to no more than a certain level and/or a requirement to increase sales volume to no less than another certain level. The rules may interact and/or impact each other as the objective of one of the rules may interfere with the objective of another rule. The system may resolve the mutual interferences between the rules to create a coherent strategy to be followed in order to meet the goals of the sale policy. The system evaluates the goals of the sale policy with respect to the commerce information representing the trade activity at the electronic marketplace to identify the best alternative for adjusting the price of the one or more items and creates a set of price setting rules to carry out this alternative.

The sale policy may include (or be translated into) a traffic strategy to increase overall traffic from one or more traffic generators to the online store, website and/or electronic marketplace hosting the item for sale by the seller. Traffic generators may present products and prices of different merchants, by crawling to the merchant's online store and/or by receiving structured data, for example, via xml. Examples of traffic generators include pricing engines and/or aggregators, for example, Google™ Shopping, Shoppingdotcom®, and/or other websites. Traffic generators may be electronic marketplaces, for example, pop-ups or links within different pages of the electronic market directing traffic to specific items, and/or the electronic marketplace itself being a traffic generator directing traffic to online stores stored on different servers. The traffic strategy may increase qualitative traffic to the site hosting the seller's items for sale. The traffic may achieve the goals set by the sales policy.

The system may determine the optimal price for a given item (optionally at a given period of time) that generates overall traffic from multiple traffic generators. The overall traffic may be optimal, for example, achieving the goals of the sales policy. Optionally, the system determines the contribution of each of the different traffic generators in producing orders for the item. One or more variables described herein may be adjusted to increase the overall traffic based on the contribution from each of the different traffic generators, for example, the price setting rules may be adjusted.

The commerce information includes for example, traffic generated by each traffic generator to the online store hosting the item for sale, consumer traffic volume, competitor sellers, prices set by competitor sellers, number of sale transactions, number of consumer views of the item, ranking of the offer of the seller, ranking of the offers of the competitor sellers, inventory level and/or other characteristics of the seller, of the competitor sellers and/or the item dynamics on the marketplace. Other characteristics of the competitor sellers may include for example, shipping time, terms of payment and/or consumers rating. In some cases the commerce information received from the electronic marketplace may not provide the granularity of single competitor sellers but rather one or more bulks of information relating to part and/or all of the competitor sellers. In some electronic marketplaces, for example Amazon Marketplace, the operator of the electronic market-place may also be a vendor offering items for sale.

The system includes a feedback loop for continuous adjustment of the price of the offer made by the seller according to real time analysis made on the commerce information collected during trade of the one or more items. For example, current ranking of the offer made by the seller compared to offers made by the competitor sellers is evaluated, a price adjustment is applied to the offer of the seller and commerce information is collected for another analysis which may result in another price adjustment. The analysis may include statistical analysis over the collected commerce information.

Optionally, the sale policy includes a plurality of operation mode parameters, for example, sale parameters, sale parameters flexibility level and/or aggressiveness level. The sale parameters, for example, minimum sales volume, minimum profit, minimum profit margin and/or inventory level define low level sale objectives which may be considered and/or evaluated while executing the sale policy. Since the sale policy defines high level goals rather than low level rules and as such the system may need some flexibility in the sale parameters received from the seller in order to create an efficient strategy to achieve the sale goals. The required flexibility may be achieved by allowing the seller to specify non-deterministic values for the sale parameters, for example, setting a range, setting a maximum level and/or setting a minimum level. The seller may specify a range for the sale parameters, for example, a scale of 0% through 100%, to indicate how closely the system should follow the sale parameters to give the system a degree of freedom in order to achieve the sale goals defined by the sale policy.

The aggressiveness level may be used to tune the system as to how aggressive it is allowed to be with respect to the competitor sellers in re-pricing the one or more items, where aggressiveness level translates to the rapidity in achieving the sale goals defined by the sale policy. Rapidity refers to the period required to meet the sales goals and is characterized through, for example the time period allocated for collecting commerce information, the amount of commerce information required for statistical analysis, the scope of the statistical analysis for adjusting the price setting rules (significance level) and/or the size of steps (in price units) taken for adjusting the price of the one or more items. For instance, a higher aggressiveness level is indicative of a shorter period and/or to the probability of achieving the sales goal defined by the sales policy in cases where the marketplace uses a non-deterministic ranking system. A high aggressiveness level may imply, for example that larger steps are taken in adjusting the price, less statistical significance is required over the collected commerce information and/or less time is allocated for learning the mechanism the system of the electronic marketplace employs for ranking the offers of the sellers. A low aggressiveness level may result in reaching the optimal price level by allocating more time for collecting more commerce information to allow for more accurate statistical analysis of the trade activity and/or taking smaller step in re-pricing the one or more items. The optimal price level may therefore be reached in a longer time but the profit margins may not be compromised. The aggressiveness level therefore may present a tradeoff between the time needed to find the optimal price level and optimization of the profit margins.

Optionally, the aggressiveness level is set automatically by the system. For instance, the system may automatically modify the aggressiveness level in order to accommodate the high level goals as stated by the sale policy, for example, the aggressiveness level may be reduced in order to maintain a profit margin level that is derived from the sale policy. The aggressiveness level may be temporarily modified for a specific period and then brought back to the original level.

Optionally, the system predicts one or more goal metrics, for example, revenue, sales, profits, margin and/or other goals. The goal metrics are optionally defined in the sales goals of the sales policy. Optionally, the prediction of the goal metrics is based on prediction of one or more intermediate metrics. The goal metrics may be correlated with the intermediate metrics to generate the prediction of the goal metrics based on the prediction of the intermediate metric, for example, based on machine learning methods. Examples of the intermediate metrics include: top rank rate of the seller, price of the items for sale, competition of the items for sale, demand for the items for sale, traffic from a respective traffic generator, conversion rates from a respective traffic generator (e.g., items bought, profit, sales, or other sales measures divided by number of visits), and/or other intermediate metrics.

Optionally, the predicted goal metrics are used to dynamically adapt the sales policy, for example, the sales goals, the rules, the strategy, operation mode parameters, and/or other policies, goals and/or rules. Alternatively or additionally, the predicted goal metrics are used to adjust the price of the item. Alternatively or additionally, the price setting rules are dynamically adjusted according to an analysis of the prediction of the sale policy. For example, the aggressiveness level may be increased if increased competition is predicted.

Optionally, the prediction is performed continuously and/or periodically, for example, based on new prediction data. Optionally, the feedback loop for continuously adjustment of the item is based on the dynamic predictions.

The prediction may allow the system to more accurately and/or efficiently achieve the seller's goals. The prediction may allow the system to anticipate events and adjust before the events occur, rather than reacting to events after they occurred. For example, the system may predict increased competition and/or a reduction in demand, even though the current item enjoys little competition and/or high demand. The prediction may allow the system to adjust parameters (e.g., price) to maintain and/or achieve the seller's goals in view of the prediction, rather than waiting until the item has succumbed to the competition and loss in demand, and then trying to recover the previous position.

Optionally, the sale policy defines long term goals in which one or more intermediate goals may be set to achieve the final goals as specified by the sale policy. The intermediate goals may be predicted. Re-predictions may take place when the intermediate time periods are reached, and/or before the final and/or intermediate time periods. For example, the system executes one or more actions to maximize sales volume of one or more items while the sales volume is below a certain level and then execute different one or more actions to maximize the profit margin after the sales volume of the one or more items reaches the certain level. Another example may be, the system executes one or more actions achieve higher market penetration and/or improve the ranking of the seller's offer. Higher market penetration may increase market share which may translate to increase in sales volume and/or profit. During the phase of market penetration the system may take actions that may result in temporary drop in profit margin and/or loss of profit.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a schematic illustration of an exemplary dynamic re-pricing system, according to some embodiments of the present invention. A re-pricing system 100 includes a processing unit that executes one or more software modules for re-pricing one or more items offered for sale on an electronic marketplace 102 and/or hosting seller online store, for example, personal computer, server, and/or a distributed processing system that includes a plurality of processing nodes. The re-pricing system 100 interacts with one or more of the plurality of sellers 101 using a plurality of client terminals, for example, Smartphone, tablet, desktop computer and/or laptop computer over one or more of a plurality of networks, for example, cellular and/or internet. For brevity, a client terminal used by a seller 101 may be referred to herein as a seller 101. The re-pricing system 100 receives from the seller 101 the sale policy for one or more items offered for sale on the electronic market 102. The sale policy defines sales goals for the one or more items. interaction with one or more of the sellers 101 may be implemented, for example through a client application executed on the client terminal and/or through a web based service accessible using a web browser and/or equivalent application executed on the client terminal of the seller 101.

Optionally, the system 100 automatically defines the sale policy. The system 100 may automatically set the goals of the sale policy through analysis of past commerce information collected during previous trade transactions of the one or more items and/or similar items. The goals of the sales policy may be dynamically adjusted by the system over time to according to analysis of the collected commerce information in order to adapt to the changes in the trade of the one or more items and maximize revenues.

The re-pricing system 100 translates the sale policy to a plurality of price setting rules which are used by the re-pricing system 100 to adjust the price of the one or more items on the electronic marketplace 102. The re-pricing system 100 communicates with the electronic marketplace 102 over the one or more networks and dynamically adjusts the price of the one or more items in order to meet the goals set by the sales policy of the seller 101.

The re-pricing system 100 monitors the trade activity relating to the one or more items offered for sale and collects the commerce information of the one or more items.

The re-pricing system 100 may predict variables related to the one or more items offered for sale. The re-pricing system 100 may predict one or more intermediate metrics associated for the items offered for sale. The re-pricing system 100 may predict metrics associated with the sale policy of the item offered for sale.

The re-pricing system 100 may be a learning system which analyzes the received commerce information and/or predicted values in order to define and/or modify the set of recommended price setting rules for adjusting the price of the one or more items. The re-pricing system 100 may continuously evolve, for example through a support vector machine (SVM) to identify the mechanisms the system of the electronic marketplace 102 employs for ranking the offers of the sellers. The re-pricing system 100 then takes one or more actions for adjusting the price of the one or more items according to the set of price setting rules.

Optionally, the re-pricing system 100 provides output interfaces for example, visual interface, textual interface and/or audio interface through which the seller 101 is presented with commerce information through which the seller 101 may track the trade activity at the electronic marketplace 102 concerning the one or more items the seller 101 offers for sale.

Optionally, the user 101 adjusts one or more of the price setting rules which dictate the course of action taken by the re-pricing system 100. The rules adjusted by the seller 101 may have precedence over the recommended rules that are automatically crated and/or adjusted by the re-pricing system 100.

Figure 2:
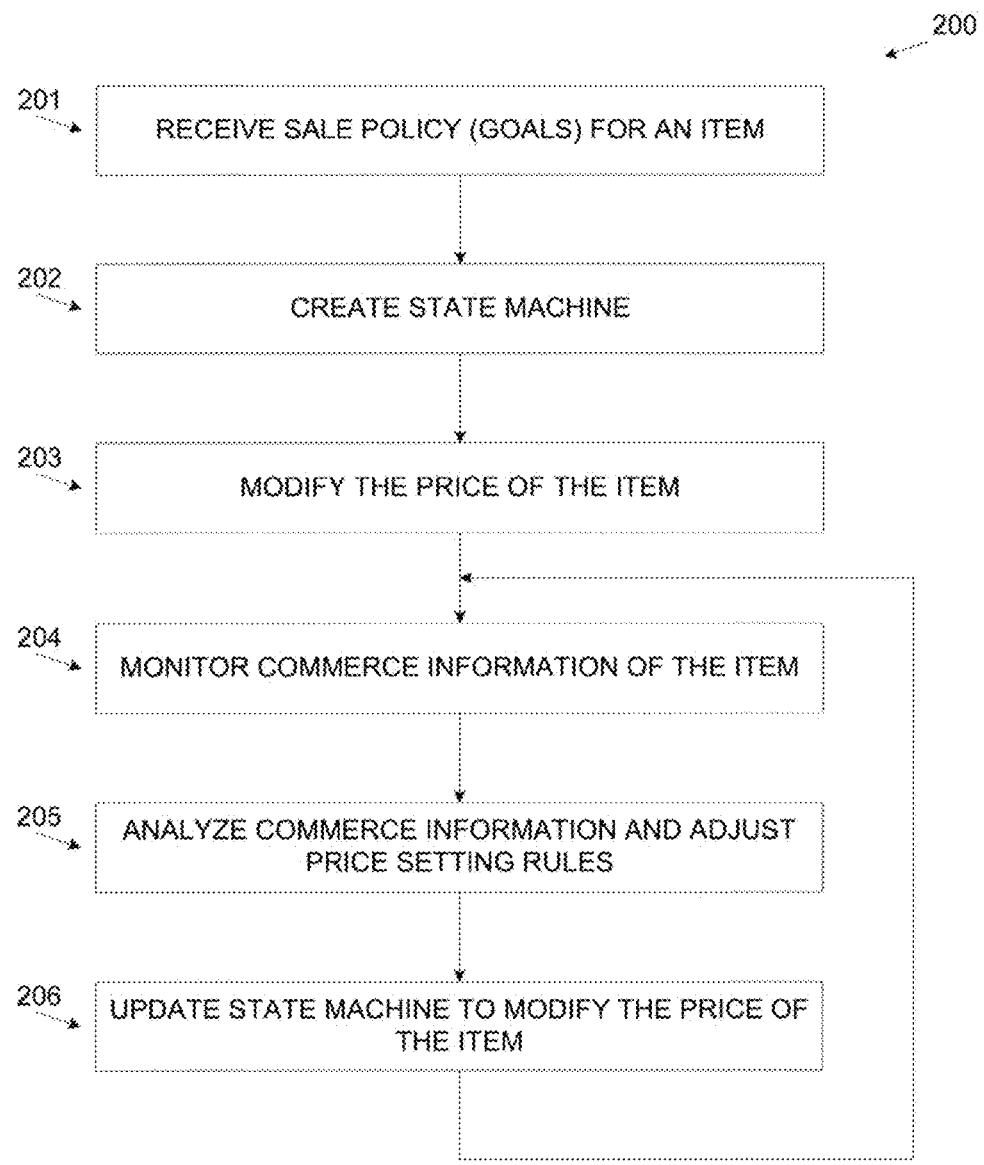
FIG. 2 is a flowchart of an exemplary process of dynamically re-pricing one or more items offered for sale on an electronic marketplace, according to some embodiments of the present invention.

Reference is now made to FIG. 2 which is a flowchart of an exemplary process of dynamic re-pricing one or more items offered for sale on an electronic marketplace, according to some embodiments of the present invention. As shown at 201, a process 200 which may be utilized through the exemplary re-pricing system 100 starts with receiving a sale policy form the seller 101. In addition the seller 101 inserts the information of the one or more items that he offers for sale at the electronic marketplace 102.

As shown in 202, a state machine is created for executing the sale policy that is received from the seller 101. The state machine employs a learning analysis mechanism (algorithm) which analyzes the trade activity of the one or more items offered by the seller 101 for sale on the electronic marketplace 102 and creates a set of price setting rules that are executed by the state machine. The analysis mechanism operates within the range of the parameters specified by the sale policy. The set of price setting rules may be modified, for example, to promote the offer of the seller 101 to get high ranking so that he may get the maximum exposure and/or be selected as the default seller by the electronic marketplace 102. Another approach for executing the sale policy may be, for example, improving terms of payment and/or acquiring sponsored adverts.

As shown at 203, the state machine may set top price and bottom price boundaries for the one or more items that are used throughout the re-pricing process 100 and sets an initial optimal price.

As shown at 204, the trade activity of the one or more items at the electronic marketplace 102 is continuously monitored to collect.

As shown at 205, the collected commerce information is analyzed to dynamically adjust in real time the recommended rules for setting the optimal price of the one or more items. The analysis includes, for example, identifying the trade activity of the one or more items, identifying the ranking of the offer of the seller 101 and checking the ranking performance of the offer of the seller 101 compared to the expectations and/or assumptions made while setting the optimal price. The recommended rules are taken to maintain operation within the parameters specified by the sale policy, for example, price boundaries, minimum profit margin, maximum profit margin and/or aggressiveness level. The optimal price is determined by analyzing real time commerce information with full, little and/or no previous commerce information. The optimal price is set by also considering the top rank rate, i.e. what is the share of the offer of the seller 101 in the top ranking position. Analysis of the commerce information may include statistical analysis.

Optionally, metrics associated with the seller's goals are predicted, for example, revenue, profit, margin and/or other metrics. Alternatively or additionally, the sales policy and/or components thereof are predicted. The seller's goals may be components of the sales policy.

The metrics associated with the seller's goals and/or sales policy may be predicted based on a prediction of one or more intermediate metrics. Machine learning methods may be applied to correlate the predicted intermediate metrics with the predicted goal and/or sales policy metrics, for example, accompanied with the corresponding weights generated by the correlation. Prediction of the intermediate metrics and then correlating to predict the sales policy may be more accurate than direct prediction of the sales policy.

The intermediate metrics may include: competition, top rank, price, demand, traffic, conversion rates, and/or other metrics. The intermediate metrics may be functions. The intermediate metrics may be calculated for a selected current or previous time period. The calculated current or previous intermediate metric may serve as a baseline level for prediction of the intermediate metric. The intermediate metric may be calculated for a selected item. The intermediate metric may be calculated for a selected time period (e.g., one day). The intermediate metric may be calculated for a selected electronic marketplace.

The competition metric denotes the probability of the seller achieving top rank in the context of a selected item. The competition metric may be calculated, for example, as a weighted average of the following parameters: average number of sellers, average number of top ranked sellers, price volatility (e.g., may imply price wars). The competition may be predicted.

The top rank metric denotes the top rank rate that the seller will gain for a given item. The top rank rate that the seller may gain may be predicted.

The price metric may denote price level of the selected item. The price level may be calculated, for example, as a weighted average of the following parameters: average top rank price during the selected time period, average seller's minimum and/or maximum prices during the selected time period. The price level may be predicted.

The demand metric may denote the popularity and/or purchase level for the item. The demand may be calculated, for example, as a weighted average of the following parameters: number of product items ordered from the seller (may be extrapolated to overall number of items ordered in the marketplace, optionally assuming the seller's top rank>preselected threshold (the order levels may be somewhat representative of the marker's order levels)); product's objective ranking provided by the marketplace (e.g., Sales Rank provided by Amazon®). The demand for the item may be predicted.

The traffic metric may denote the traffic generated to the hosting online store for a respective traffic generator. The traffic generated by each traffic generator may be predicted.

The conversion metric may denote the conversion rate for the hosting online store, optionally the conversion rate generated for a respective traffic generator. The conversion rate may be predicted.

Other intermediate metrics may be calculated and/or predicted.

The parameters used to calculate the intermediate values described above are optionally normalized and/or weighted before being summed up into the final measure of the intermediate value.

Optionally, the intermediate value is predicted, for example, by applying trend analysis, for example, using linear and/or logistic regression, and/or other extrapolation methods and/or other machine learning methods.

Optionally, the prediction is performed for a selected item. Alternatively or additionally, the prediction is performed for a selected future time period. Alternatively or additionally, the prediction is performed for a selected electronic marketplace. Optionally, a statistical significance denoting the probability of the predicted intermediate value is calculated. A statistical significance may be calculated for the metrics of the seller's goals and/or sales policy.

Predictions of the intermediate variables may be calculated based on correlations with measured metrics, measured past and/or current intermediate variables, correlations with predicted intermediate variables, and/or based on other methods. When correlation is high (e.g., above about 70%, or above about 80%, or over about 90%, or over about 95%, or other values), a relationship between the predicted intermediate variable and the intermediate variable to be predicted may be calculated, for example, by generation of a transformation function.

Optionally, the top rank is predicted by determining the correlation between the competition function (e.g., as described above) and the seller's actual top rank rate over a period of time. When the correlation value is high, a transformation function may be generated from the competition prediction function to the top rank prediction function.

Optionally, the prediction of the goal metric and/or intermediate metric is used in adjusting one or more system variables, for example, the sales policy, sales goals, rules, strategy, item price, operation mode parameters, aggressiveness level, and/or other parameters as described herein. Optionally, the prediction provides automatic feedback for the system and/or manual feedback to the seller. Based on the prediction, the system and/or seller may consider different alternatives and select the best one.

Optionally, the performance of the system is continuously and/or periodically reassessed based on the prediction, for example, the selling status of a given item in the market place. Optionally, actions are performed based on the prediction, for example, the aggressiveness level is increased.

As shown at 206, the state machine employs one or more of the recommended rules and modifies the price of the one or more item to the optimal level.

Optionally, the process 200 is iterative and is performed in one or more iterations. The trade activity at any price point may be monitored to collect commerce information which may be analyzed to take further action in order to promote the seller 101 and achieve the goals set by the sale policy. The period allocated for analyzing the commerce information in order to learn the mechanism of the system of the electronic marketplace 102 during each iteration as well as the increase and/or decrease in the optimal price may be dictated by the aggressiveness level (if specified by the sale policy). The increase and/or decrease in the optimal price may also depend on the performance of the offer of the seller 101 in ranking, for example, in case the offer of the seller 101 continuously gets top rating, the increases in the optimal price will grow linearly or non-linearly from one price point to the next.

Optionally, setting the initial price is done by identifying one or more groups of competitor sellers offers and setting a price which emphasizes the advantage the offer of the seller 101 has over the offers of competitor sellers. The one or more groups may be created with respect to a static characteristic of the item and/or the seller, for example shipping time, terms of payment and/or seller rating. Each group may include one or more offers. The initial price is set by analyzing the static competitive advantage the offers of sellers in each group have over the offer of the seller 101 so as to eliminate the competitive advantage through an attractive price. Analysis may focus on groups consisting of offers by competitor sellers which continuously and/or repeatedly receive top ranking by the system of the electronic marketplace 102, so that by over performing them the offer of the seller 101 receives top ranking.

The following is an exemplary algorithm for determining the price of the item based on traffic generated to the hosting online store and/or electronic marketplace 102 by traffic generators. The algorithm analyzes the traffic generated by each respective traffic generator, and adjusts the price of the offer of the seller 101 accordingly. The traffic algorithm may be executed, for example, during block 205 of FIG. 2, and/or by analysis module 304 of FIG. 4. The traffic algorithm may be integrated with the state machine, for example, the state machine adjusts the price setting rules and/or modifies the price based on the analysis of the traffic algorithm.

Figure 18:
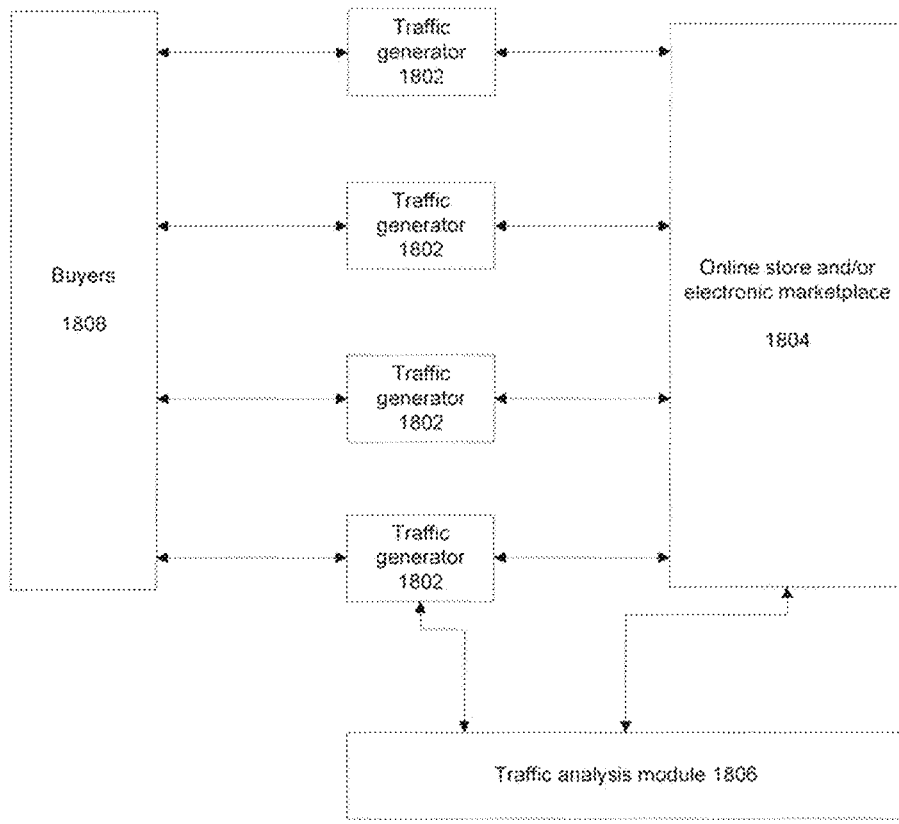
FIG. 18 is a block diagram of traffic generators for generating traffic to an online store and/or electronic marketplace, in accordance with some embodiments of the present invention.

To help understand the algorithm (and other references to traffic generators as described herein) reference is made to FIG. 18, which is a block diagram of multiple traffic generators 1802 generating traffic to an online store 1804, in accordance with some embodiments of the present invention. Traffic may be generated by buyers 1808 accessing traffic generators 1802. Online store 1804 may be an electronic marketplace (e.g., with multiple vendors), an exclusive website offering items from the exclusive seller, or other models of electronic commerce.

An analysis module 1806 analyzes traffic generated by traffic generators 1802 to online store 1804. Analysis module 1806 may be, for example, as described herein with reference to analysis module 304 of FIG. 3, block 205 of FIG. 2, or other traffic analysis methods and/or systems.

Optionally, analysis module 1806 executes the exemplary traffic algorithm. The traffic algorithm may determine reference prices at traffic generators, for example, major selling website channels such as Amazon® and/or Ebay™. Prices may be determined for the item at a selected time frame. The reference prices may be generated based on the selected strategy, for example, to maximize sales, profits and/or margins.

Traffic generator 1802 and online store 1804 may be independent, separate and/or distinct web site, for example, residing on different servers, and/or operated by different entities. Alternatively, traffic generator 1802 and online store 1804 are part of a single unit. For example, traffic to a specific item or webpage (i.e., store 1804) may be generated from other parts of the website, electronic marketplace, and/or online store. For example, a customer browsing for a slow cooker on a certain page of a certain website may be presented with a link to a book of slow cooker recipes for sale on a different page of the same website. The link to the book may be traffic generator 1802, and the page of the book may be online store 1804.

The traffic algorithm collects data and analyzes the data over a period of time. The data is collected for each traffic generator, for the selected item(s). The data may be analyzed to determine a correlation between each reference price for the item and an optimal price or each respective traffic generator. For example, the price that generates the optimal traffic through the respective traffic generator. The optimal traffic may be the traffic that best meets the selected strategy. Different prices may be set at different points in time. The reference prices may be used as a baseline for setting the different prices. The different prices may be selected based on the prediction.

The traffic algorithm assigns weights in the context of each item, for each reference price, for each traffic generator. For example, the system may determine that the optimal price for an item in Shoppingdotcom® is 0.78*Amazon's reference price for the product +0.35*Ebay's reference price for the product. The traffic algorithm may occasionally recalibrate the weights.

For the item, the traffic algorithm may determine the importance and/or potential of each traffic generator. A weight may be assigned based on the importance. The weight may reflect the contribution of the respective traffic generator in producing orders. Traffic generators may be evaluated based on quality and/or quality of traffic. The highest weights may be assigned based on the number of generated orders and/or based on the profitability of the generated orders. The traffic algorithm may occasionally recalibrate the weights.

The traffic algorithm may occasionally apply the determined weights to the reference prices. The traffic algorithm may operate in a feedback loop.

Optionally, the following exemplary algorithm and supporting API are used for setting the initial price of the one or more items offered for sale by the seller 101 on the electronic marketplace 102. Presentation of the exemplary algorithm is done with reference to buy box which relates to the top ranking offer (or default offer) as may be done in some electronic marketplaces for example, Amazon Marketplace. The algorithm analyzes the commerce information and adjusts the price of the offer of the seller 101 accordingly. The algorithm is expressed in pseudo code using some functions of the supporting API.

The following definitions may be used throughout the algorithm:

1) The API function attr_pref(attribute, value 1, value 2) which is an ordinal relationship, may determine the preference of one group attribute value over another group, for example, shipping time, consumer rating, shipping coverage. For instance, a seller who ships within of maximum 2 days may be preferred over another seller who ships in up to 3 days. The function takes into account only one attribute at a time and may avoid all other attributes. The function returns the following output values: <, >, =.
2) The API function grppref (group 1, group 2) which is an ordinal relationship, may determine the preference of one group over another group. The function returns the following output values: <, >, =, UNKNOWN.
It may be presumed, for example, that if group 2 is preferred over group 1, sellers in group 2 may have better chance to win the buy box over sellers in group 1, given that they offer the same price.
3) The API function num_of_groups_by_price(price) returns number of groups, for which lowest offer price matches the given price.
4) The API function num_of_merchants_by_group (group) returns the number of merchants (sellers) that were considered for that group.

The algorithm may receive the following input:

1) Current lowest offers for the product (item).
2) Current buy box price for the product (item).

---

IF num_of_groups_by_price(buy box price) = 1 THEN
    buy box group is the group with the matching price.
ELSE
    stay empty.
IF num_of_groups_by_price(merchant price) > 0 AND one of the matching groups is proven to indeed include the offer of the merchant (via the second API call) then merchant group is the group with the matching price.
ELSE
    stay empty.

---

The algorithm may execute as follows:

The algorithm is designated for determining the new suggested price for a given merchant and product. It handles the various scenarios, where main division is whether the user currently holds buy box or not. The fact that suggested price may be in the range of [floor price, ceiling price] is since this is obvious.

Scenario in which the Merchant (Seller 101) does not Hold the Buy Box:

---

IF merchant group are known - then
    IF merchant price isn't lowest in his group THEN
        Merchant new price = lowest price in the group − PricePortion
/* where PricePortion denotes the amount (step) in which the price may be
adjusted by the system */
/* Note: this line may not be reached since the merchant's group is
determined by the fact that the merchant has the lowest price within the group. */
    ELSE
        Remove all lowest offer listings belonging to groups that are
        lower than the merchant group {leave the merchant's group}.
        New merchant price = lowest price of the remaining groups −
        PricePortion
/* Note: This may be because the existing prices weren't low enough to
obtain buy box */
        IF previous merchant price − new merchant price < PricePortion
        THEN
            New merchant price = previous merchant price − PricePortion
/* Note: if buy box group < merchant group, existing prices of groups >=
merchant group were not sufficient for buy box, therefore the lowest price
within them may be used as anchor. If buy box group >= merchant group,
only one (by definition) of the groups >= merchant groups, gained the buy
box, but all others failed - so a more competitive offer compared to these
groups may be suggested.
Nevertheless, scenarios may be encountered in which the price of the buy
box group is very low, thus it may take prolonged time to reach its
surroundings. */

---

Scenario in which the Buy Box Group is Known and Merchant Group is Unknown:

---

Remove all lowest offer listings belonging to groups that are lower
    than the buy box group or that their price is lower than the buy box
    price.
    New merchant price = lowest price of the remaining groups −
    PricePortion
/* Note: this may be because the existing prices weren't low enough to
obtain buy box, it may be assumed the merchant (seller 101) is within
those groups. */

-continued

```
IF previous merchant price - new merchant price < PricePortion
THEN
    New merchant price = previous merchant price - PricePortion
```

Scenario in which the Buy Box Group is Unknown and Merchant Group is Unknown:

```
New merchant price = buy box price - PricePortion
IF previous merchant price - new merchant price < PricePortion THEN
    New merchant price = previous merchant price - PricePortion
```

Scenario in which the Merchant (Seller 101) Holds the Buy Box:

```
IF buy box group is known (=merchant group is known) THEN
    IF num_of_merchants_by_group(merchant group) <= 1
    THEN
        Remove all lowest offer listings belonging to groups that
        are lower than the merchant group, as well as the
        merchant's group.
        New merchant price = MAX(lowest price of the remaining
        groups - PricePortion, buy box price + PricePortion)
    ELSE
        New merchant price = buy box price
/* Note: Adding PricePortion may be considered, but probably should not
since it is believed that Amazon, for example, tends to take lowest in the
group. */
```

Scenario in which Box Group is not Known (i.e. Merchant Group is not Known)

```
    Remove all lowest offer listings that their price is lower than the buy
    box price
/* Note: it is assumed that these offers did not secure the buy box prob-
ably
due to their grouping and lack of competitive pricing. The price may be
raised to verify this.*/
    New merchant price = MAX(lowest price of the remaining groups -
    PricePortion, buy box price).
/* Note: it may be considered to add PricePortion to the later component
in
the MAX function, but it probably should not be done since it is believed
that Amazon, for example, tends to take lowest in the group. */
```

Optionally, the algorithm makes the following assumptions:
1) It is assumed that the highest ranking offer having the lowest price belongs to a certain group when the certain group is the only group which includes an offer having a price which equals the price of the highest ranking offer which is the lowest price offer.
2) It is assumed that there are offers having lower price than the price of the offer of the seller 101 when the offer of the seller 101 is not the lowest price offer in one or more groups.
3) It is assumed that even when the price of the offer of the seller 101 is the lowest price offer in his group there may be other one or more offers having the same price in other one or more groups.
    To determine which group the seller 101 is included in, the algorithm is executed again with the seller 101 excluded from the analysis (ExcludeMe flag is set to TRUE).

Optionally, the commerce information includes past information on previous sales, past trade activity and/or dynamics and/or interaction of the sellers and the consumers with respect to the one or more items. The past commerce information may be used to educate the learning analysis mechanism and is analyzed to improve prediction, to support setting the initial price and/or to support the dynamic adjustments to the prices of the one or more items. Analyzing the past commerce information may be useful for a plurality of ends, for example, provide more accurate pricing compared to previous pricing of one or more competitor sellers, identify trade patterns and/or make predictions for future trade patterns. Analysis of the past commerce information may also be used by the learning analysis mechanism to understand the criteria and way the system of the electronic marketplace 102 ranks the sellers on the arena.

Optionally, analysis of real time and/or past commerce information may also be used to overcome incomplete commerce information that is received from the electronic marketplace 102, for example, missing one or more characteristics of the price and/or sellers and/or there is no full correlation between specific competitor sellers and the items they offer for sale.

Optionally, in case aggressiveness level is specified by the sale policy, the aggressiveness level dictates the rapidity in achieving the goals of the sale policy. The rapidity in achieving the goals of the sale policy may impact the execution of the re-pricing iterations, for example, the time allocated for collecting the commerce information and analyzing it during the iteration, the amount (in units) in price adjustment and/or the need for generating statistical information. While employing the aggressiveness level while re-pricing the one or more items additional parameters may be required, for example, recent price range of the one or more items for the top ranking competitor sellers' offers and/or recent price range of the one or more items for all competitor sellers' offers. The additional parameters may be weighted so as to have some more influential than others. The aggressiveness level may be employed in a linear or non-linear transformation function for transforming the aggressiveness level into metrics for re-pricing the one or more items. Expression 1 below provides an example to such a transformation function.

Expression 1:

$$f(AggressivnessLevel, X_1, X_2) = \frac{1}{\frac{2(W_1 \times X_1 + W_2 \times X_2)}{100}} \times AgressivnessLevel$$

Where:

$X_1$ denotes a recent price range of the one or more items for top ranking competitor sellers' offers.

$X_2$ denotes a recent price range of the one or more items for all competitor sellers' offers.

$W_1$ denotes a weight given to the offers of the top ranking competitor sellers.

$W_2$ denotes a weight given to the offers of all competitor sellers.

AggressivenessLevel denotes the aggressiveness level as derived from the sale policy and provided on a scale of 0 through 100.

In an exemplary re-pricing process, the following values are given:

$$X_1 = \$10, X_2 = \$20, W_1 = 1.0, W_2 = 0.75,$$

$$AgressivenessLevel = 50$$

$$f(AgressivnessLevel, X_1, X_2) = \frac{1}{\frac{2(1 \times 10 + 0.75 \times 20)}{100}} \times 50 = 6.25$$

Taking the above values into consideration, during the next re-pricing cycle the price of the one or more items is set to $6.25 less than the current price of the one or more items offered by the seller 101.

Optionally, the analysis made by the learning analysis mechanism includes trade off analysis. Trade off analysis may identify scenarios in which, for example, a small decrease in price may increase dramatically the ranking of the offer of the seller 101 and/or a little decrease in ranking may increase dramatically the price and/or profit. As part of the trade off analysis an optimal constellation is selected to provide the best tradeoff within the sale policy and the parameters defined by the sale policy.

Optionally, the re-pricing process 200 identifies scenarios of unfulfilled potential and adjusts the price of the one or more items to extend the profits. An unfulfilled potential scenario may be, for example, the one or more items has high profit margin and high sales potential that is not reached due to low ranking of the offer. The re-pricing system 100 monitors the commerce information and identifies the offer of the seller 101 is continuously ranked low by the system of the electronic marketplace 102. The price of the one or more items may be adjusted to reduce the price at the expense of reducing the profit margin. However, the increase in volume may provide higher profit for the portfolio of the seller 101. Another example may be, a scenario in which the offer of the seller 101 gets high ranking but has low sales volume. In order to increase the sales volume, the re-pricing system 100 may reduce the price of the one or more items on the assumption that more consumers may be interested in purchasing the one or more items at the reduced price. The re-pricing system 100 may repeat this process while analyzing the commerce information during each re-pricing iteration (price point). The analysis may result in further adjustments (increases or decreases) to the price to achieve higher sales volume.

Optionally, the seller 101 has access to the commerce information collected during the process 200. The collected information may include current commerce information and/or past commerce information. The commerce information may be presented to the seller 101 using a plurality of means, for example, textual, audible and/or visual means. The commerce information may include a plurality data items, for example, tracking performance indicators, such as sales, orders, profit and/or Buy Box share. Commerce information may be further processed to provide statistical data on the trade, for example, revenue, sales, profit, profit margin, orders and/or average price. Trade statistics may be provided on a plurality of views, for example per one or more items, per items line, per items category and/or per portfolio. This information may enable the seller 101 to evaluate the performance of the re-pricing system 100, identify market trends, identify best selling items and/or modify the sale policy and/or the sale goals.

Optionally, the recommended rules created and/or modified by the learning analysis mechanism are available to the seller 101. The seller 101 may analyze the commerce information presented by the re-pricing system 100 and manually intervene in the automatic re-pricing process executed by the re-pricing system 100 to alter the rules and/or recommendations for re-pricing the one or more items.

Optionally, alerts are generated to the seller 101 to indicate of a plurality of events that occur during the trade of the one or more items. Defining conditional events for triggering alerts may be created automatically by the re-pricing system 100 and/or set manually by the seller 101. Alerts may be generated for a plurality of events, for example, drop in sales volume, drop in profit, drop in profit margin, low inventory, high inventory, and/or inability to meet the sale policy goals. The alerts may be associated with recommended actions to be taken by the seller 101, for example, adjust price setting rules, modify policy goals and/or replenish the inventory for the one or more items.

Optionally, in the event there are items offered for sale by the seller 101, prioritization is made between two or more of the items in order to control the frequency of the re-pricing iterations to avoid overloading the re-pricing system 100 and/or avoid performing unnecessary re-pricing adjustments. Some items may require more frequent tracking and re-pricing than other items due to intensive trade activity, aggressive competition and/or rapid changes in ranking of the offers of the sellers. The items requiring more frequent tracking and re-pricing receive higher priority from the re-pricing system 100 that manages the re-pricing process 200.

Optionally, extrapolation is performed during the analysis phase to overcome lack of commerce information at the price point set during the current re-pricing iteration. Commerce information that is collected in real time and short term past may lack sufficient data points to provide a statistically significant data set, from which reliable conclusions may be derived. To overcome this, commerce information may be collected for one or more adjacent price points and deducted to other price points to create a sufficient data set for the target optimal price point.

Optionally, the inventory level that is displayed to the consumers for the one or more items represents a partial inventory level replenished as inventory goes down. Presenting the consumer with the partial inventory level to imply upcoming possible shortage in the one or more items may encourage consumers who are hesitating to make the order for the one or more items.

Figure 3:
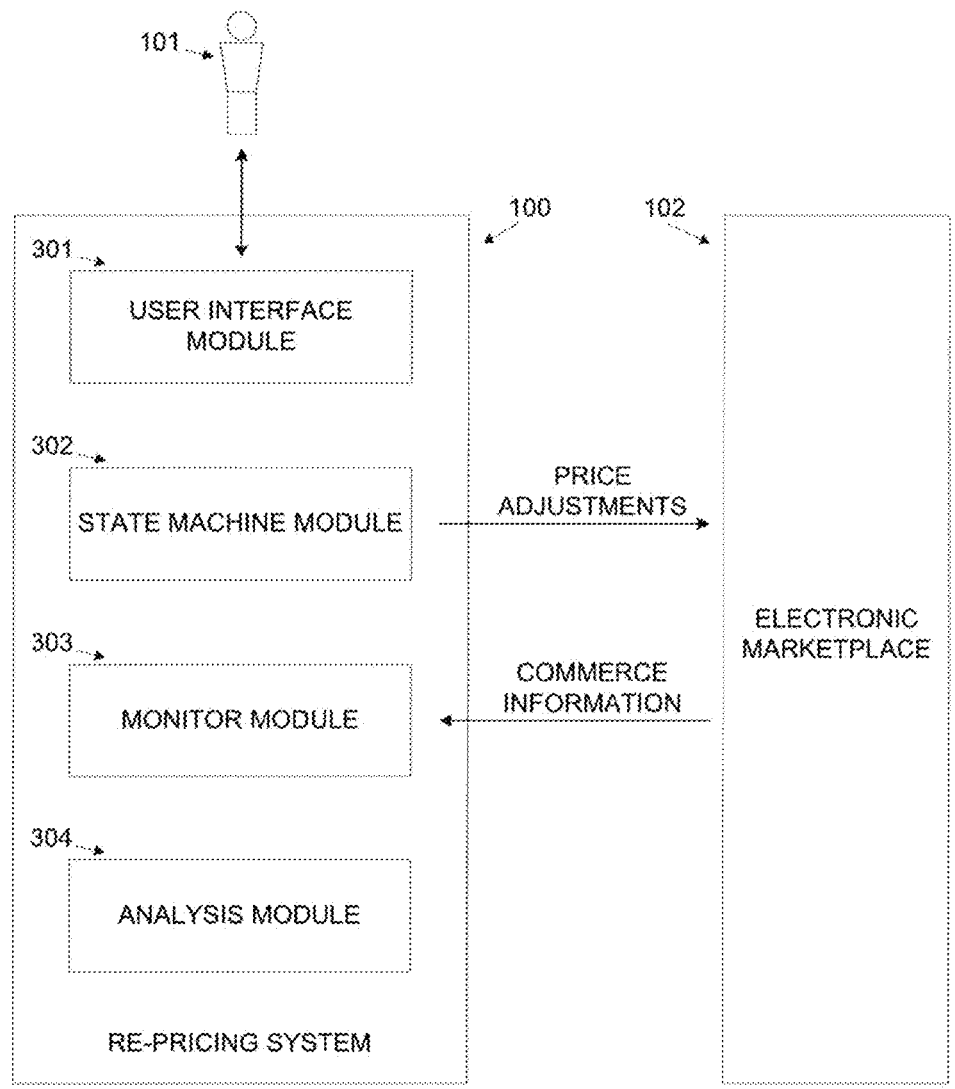
FIG. 3 is a schematic illustration of exemplary software modules executed by an exemplary re-pricing system, according to some embodiments of the present invention.

Reference is now made to FIG. 3 which is a schematic illustration of exemplary software modules executed by an exemplary re-pricing system, according to some embodiments of the present invention. A re-pricing system such as the re-pricing system 100 includes a user interface module 301, a state machine module 302, a monitor module 303 and an analysis module 304. The re-pricing system 100 is executed on a processing unit which is capable of communicating with the electronic marketplace 102 over the one or more networks. The re-pricing system 100 receives the sale policy from the seller 101 through the user interface module 301. The sale policy defines sales goals for the one or more items the seller 101 offers for sale on an electronic marketplace 102.

The user interface module 301 may be utilized, for example, through a web based service accessed using a web browser and/or through a client application. The web browser and/or the client application may be executed on one or more of a plurality of client terminals, for example, Smartphone, tablet, work station, desktop computer and/or laptop computer. The user interface 101 communicates with the re-pricing system 100 to transfer the sale policy to the re-pricing system 100. The communication between the user interface 101 and the re-pricing system 100 may be local in case the user interface 101 executes on the same processing unit as the re-pricing system 100. In case the user interface 101 executes on client terminal that is remote from the processing unit hosting the re-pricing system 100 the user interface 101 may communicate with the re-pricing system 100 over the one or more of a plurality of networks.

Once the sale policy is received at the re-pricing system 100, the state machine module 302 is created to execute one or more actions to achieve the goals defined by the sale policy. The state machine module 302 interacts with the analysis module 304 to receive a plurality of price adjusting rules for adjusting the price of the one or more items. The state machine module 302 may communicate with the system of the electronic marketplace 102 through the one or more networks to adjust the price of the one or more items. The state machine 102 may interact with the system of the electronic marketplace 102 using an application programming interface (API) available from the operator of the electronic marketplace 102. The API may define system calls, a function set and/or libraries allowing interaction with external systems in order to transfer data.

The monitoring module 303 continuously monitors the trade activity of the one or more items the seller 101 offered for sale to collect commerce information. The monitoring module 303 may communicate with the system of the electronic marketplace 102 through the API available from the operator of the electronic marketplace 102.

The monitored commerce information received through the monitoring module 303 is forwarded to the analysis module 304. The analysis module 304 includes or connected to a learning module analyzing the commerce information in order to define and/or modify the set of price setting rules for adjusting the price of the one or more items. The analysis module includes or is connected to a prediction module for prediction of one or more metrics associated with the sale policy and/or prediction of one or more intermediate metrics. The prediction of the sale policy may be based on correlation with the prediction of the intermediate metric.

The analysis module 304 may continuously evolve to identify the mechanisms and/or parameters and/or weights by which the system of the electronic marketplace 102 ranks the offers of the sellers. The set of price setting rules is then transferred to the state machine module 302 which performs one or more actions according to the set of price setting rules to adjust the price of the one or more items in order to meet the goals set by the sale policy of the seller 101.

Optionally, the user interface module 301 provides output interfaces for example, visual interface, textual interface and/or audio interface through which the seller 101 may track the trade activity and/or adjust one or more of the rules which dictate the course of action taken by the re-pricing system 100.

Figure 4:
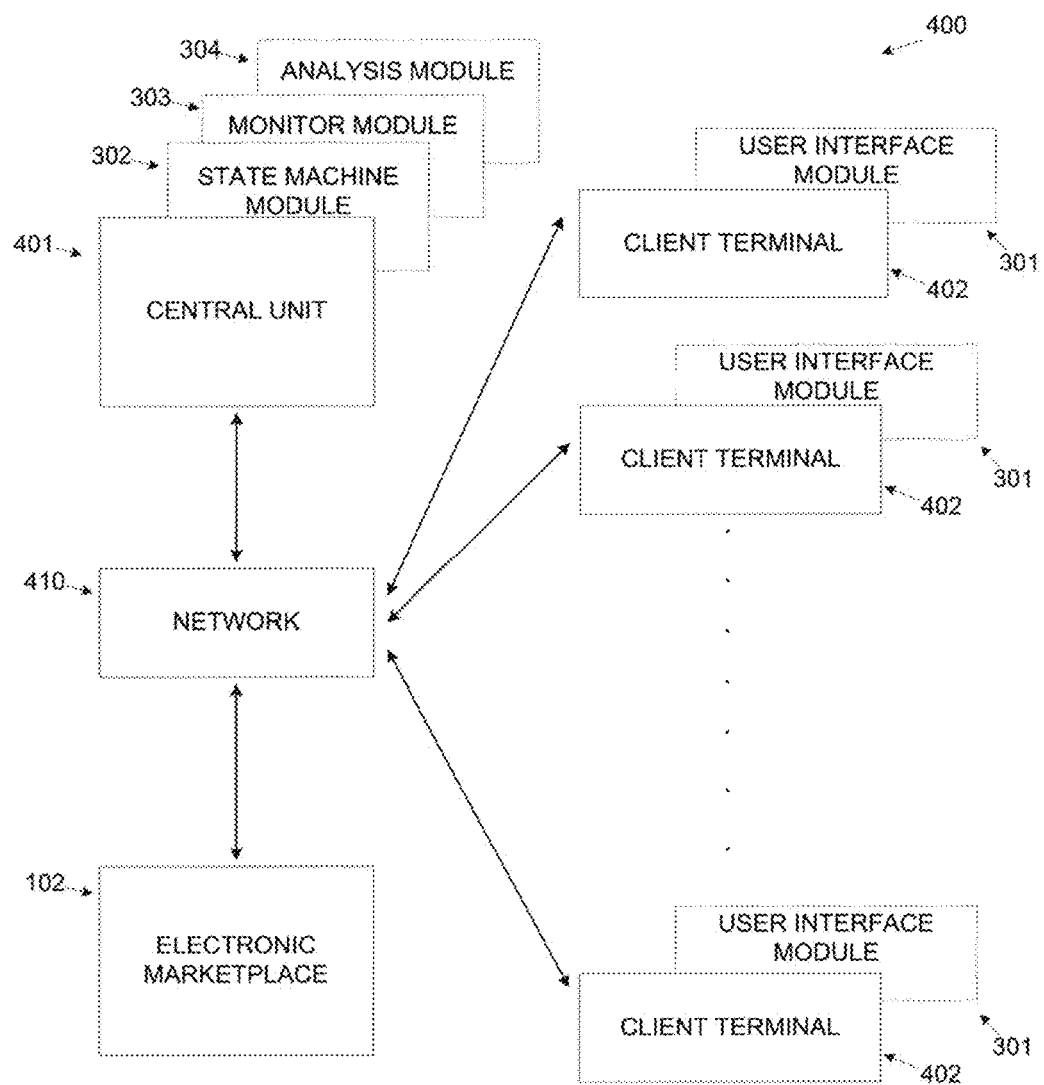
FIG. 4 is a schematic illustration of an exemplary distributed re-pricing system, according to some embodiments of the present invention.

Reference is now made to FIG. 4 which is a schematic illustration of an exemplary distributed re-pricing system for dynamically re-pricing one or more items offered for sale on an electronic marketplace, according to some embodiments of the present invention. A distributed re-pricing system 400 includes a central unit 401, for example, server, desktop computer and/or laptop computer which communicates over a network 410, for example, cellular and/or internet with a plurality of sellers 101 having a plurality of client terminals 402, for example, Smartphone, tablet, desktop computer and/or laptop computer. The system 100 may be distributed among one or more processing units, for example the central unit 401 and/or the one or more client terminals 402. The central unit 401 has a processing unit which is capable of executing software program instructions executes a software program comprising for example of the state machine module 302, the monitor module 303 and/or the analysis module 304. The central unit 401 executing the re-pricing software application communicates with the electronic marketplace 102 over the network 410 to monitor the price of the one or more items and/or to monitor commerce information relating to the one or more items. The seller 101 using the client terminal 402 interacts with the re-pricing software application executed on the central unit 401 through a user interface, for example the user interface module 301 which is executed on the client terminal 402. The user interface module 301 executed on the client terminal 402 may be implemented through a software application program executed on the client terminal 402 and/or through a web based service which is accessed from the client terminal 402 using a web browser and/or a similar web access application.

Optionally, the re-pricing software application is executed on the client terminal 402 which has access to the electronic marketplace 102 over the network 410 without going through the central unit 401. In this case the entire re-pricing system is executed on the client terminal 402.

Some embodiments of the present invention, are presented herein by means of an example, however the use of this example does not limit the scope of the present invention in any way.

A numeric example for a re-pricing process such as the process 200 performed by a re-pricing system such as the system 100 is presented herein. The seller 101 (denoted S) is offering an item (denoted P) for sale on an online marketplace, such as the electronic marketplace 102 where additional sellers (S1, S2, S3) are listed for the same product, each listing having a price.

Current Prices and Top Rank Rates of Each Offer of the Sellers are as Follows:
  S: $11.50, 15%
  S1: $10, 35%
  S2: $11, 50%
  S3: $11, 0%

Objectives & Settings:
  Floor price of item P by the seller 101 S=10$
  Ceiling price of item P by the seller 101 S=20$
  Target top rank rate=50%
  Aggressiveness level=50%

Goal:
  Reach 50% top rank rate, with pricing as high as possible—but within the floor/ceiling price boundaries, as fast as possible considering aggressiveness level of 50%.

Algorithm Execution:
  1) System collects data points regarding the current pricing and ranking for item P.
  2) System organizes sellers into groups as follows:
     G1={S}
     G2={S1, S2}
     G3={S3}
     After grouping the sellers and analyzing the lowest pricings of the groups, system suggests an initial price of $10.85.
     Setting the initial price of the item is performed, for example, as presented by the exemplary algorithm for setting the initial price of an item.

3) At this stage, no further adjustment is made to the price, since historical pricing/ranking information is insufficient. System sets the initial price ($10.85) for the item on the electronic marketplace 102.
4) The system repeatedly samples the electronic marketplace 102 and collects commerce information, including, for example, prices of offers and/or ranking of offers. The system continuously tracks the differences in price between the seller 101 S compared with the competitor sellers S1, S2, S3 and also compared to other groups. The resulting top rank rate of the seller 101 S in accordance to the price differences is also monitored.
5) During the trade the system concludes that setting the price of the item P to $10.85 will result in 20% of top rank rate. Setting the price of the item P to $10.85 means maintaining price differences of $0 between the seller 101 S and G1, −$0.85 between the seller 101 S and G2 and +$0.15 between the seller 101 S and G3.
6) As the objective of the process is top rank rate of 50%, the system will continue reducing the price until the objective is reached. In case the objective is not reached and the price exceeds the bottom price boundary, the number of samples required for determining the impact of the change, before applying further changes, depends on the aggressiveness level. For this example, the aggressiveness level is set to 50%, so 4 samples are required. Additionally, the price amount unit (step) to be inducted or deducted from the price is a function of the competitor sellers S1, S2, S3 pricings and the aggressiveness level. In this case, the price amount unit is set to $0.05.
7) Eventually, after several re-pricing iterations it is discovered that the price of $10.75 brings the seller 101 S to the desired top rank ratio (50%).
8) If during the trade, conditions change, for example, the sellers S1, S2 and/or S3 adjust their offers pricing, top rank rate of the seller 101 S changes and/or new offers are made by additional competitor sellers, the system will repeat the above process to find a new optimal price that will meet the objectives of the seller 101 S.

Exemplary user interface such as the user interface 101 of an exemplary system such as the re-pricing system 100 are provided. The example provides screen captures of the user interface such as the user interface 101 of a re-pricing system such as the re-pricing system 100. Through the user interface 101 the seller 101 may be presented with commerce information and/or adjust the recommended rules for re-pricing the one or more items. The screen captures are presented in a user friendly graphical manner for simple of use and comprehension.

Figure 5:
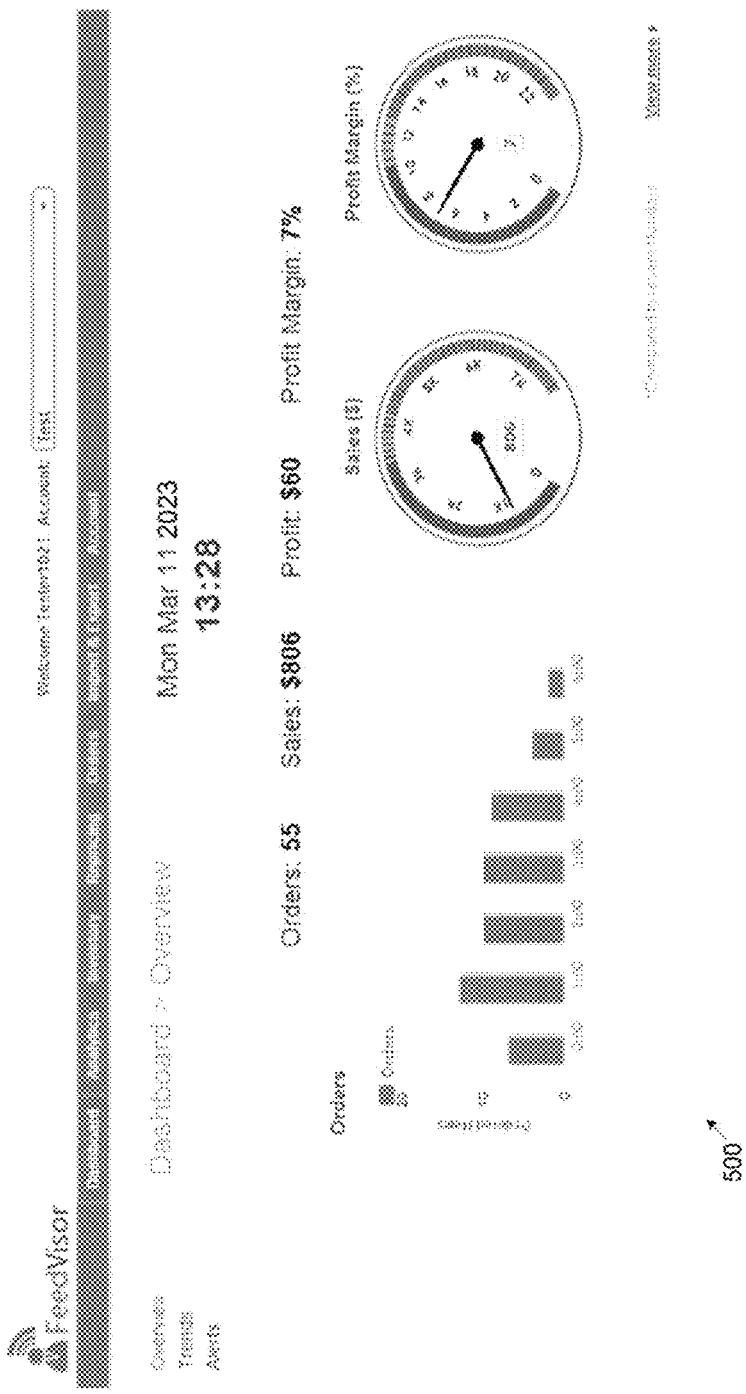
FIG. 5 is a screen capture of an exemplary overview screen of item sales as presented by an exemplary user interface of an exemplary re-pricing system, according to some embodiment of the present invention.

Reference is now made to FIG. 5 which is a screen capture of an exemplary overview screen of item sales as presented by an exemplary user interface of an exemplary re-pricing system, according to some embodiment of the present invention. The screen capture 500 presents to the seller 101 an overview of the commerce information relating to the one or more items over the past 24 hours, for example, overall sale transactions, overall sales value, overall profit and/or overall profit margin. The overview may be set by the seller 101 to present commerce information at a plurality of levels, for example, one or more items, product line, product category and/or portfolio. Selection of the level of products to be presented is done through a selection box available by the user interface module.

Figure 6:
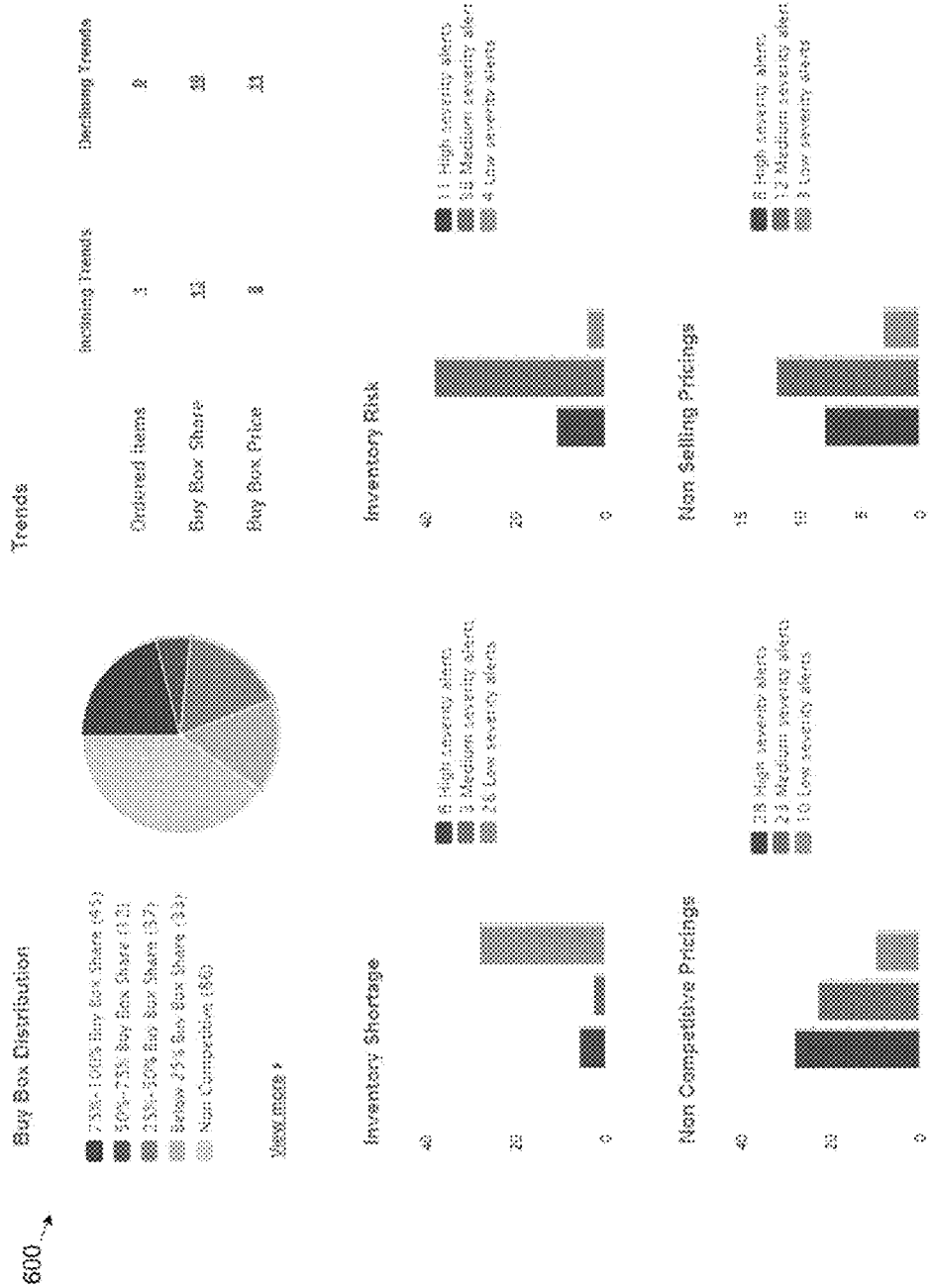
FIG. 6 is a screen capture of an status screen of an item with respect to competition as presented by an exemplary user interface of an exemplary re-pricing system, according to some embodiment of the present invention.

Reference is now made to FIG. 6 which is a screen capture of an exemplary status screen of an item with respect to competition as presented by an exemplary user interface of an exemplary re-pricing system, according to some embodiment of the present invention. The screen capture 600 presents to the seller 101 an overview of an exemplary buy box distribution for the one or more items offered on the Amazon Marketplace. The buy box represents the default seller that is selected by the system of the marketplace 102. The default seller is the seller 101 whose offer for the one or more items received the highest ranking. The presented information relates to the offer of the one or more items and may include, for example, the share the offer took in the overall buy box transactions, trends identified during trade activity, inventory shortage and/or inventory risk with respect to sales volume. In addition the screen capture 400 may include additional information, for example, information relating to non-competitive and/or non-selling offers and/or alerts generated during the trade activity to inform the seller 101 of specific events.

Figure 7:
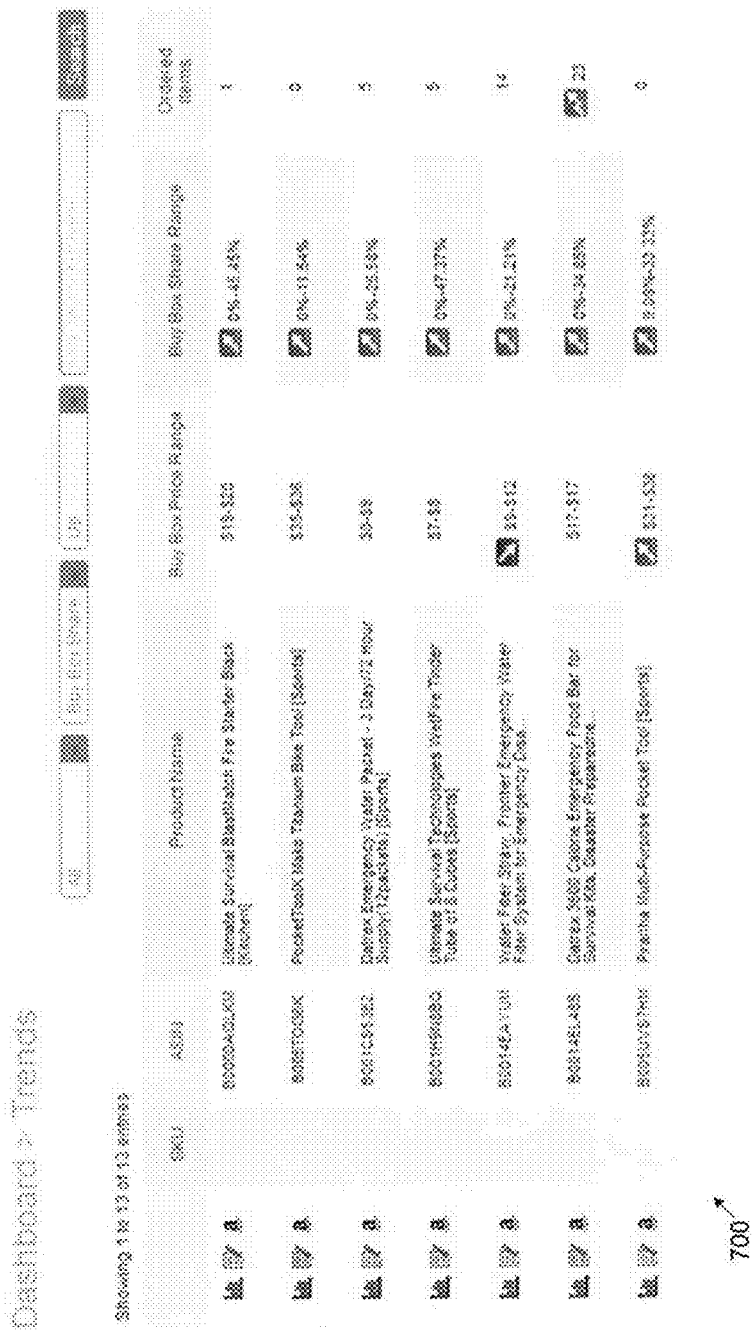
FIG. 7 is a screen capture of an exemplary trends overview as presented by an exemplary user interface of an exemplary re-pricing system, according to some embodiment of the present invention.

Reference is now made to FIG. 7 which is a screen capture of an exemplary trends overview as presented by an exemplary user interface of an exemplary re-pricing system, according to some embodiment of the present invention. The screen capture 700 presents to the seller 101 overview of trends of a plurality of items organized as a table with multiple entries, each entry presents a different item. The table describes a plurality of commerce information items, for example, item identifier, item name, buy box price range, buy box share range and/or number of sale transactions.

Figure 8:
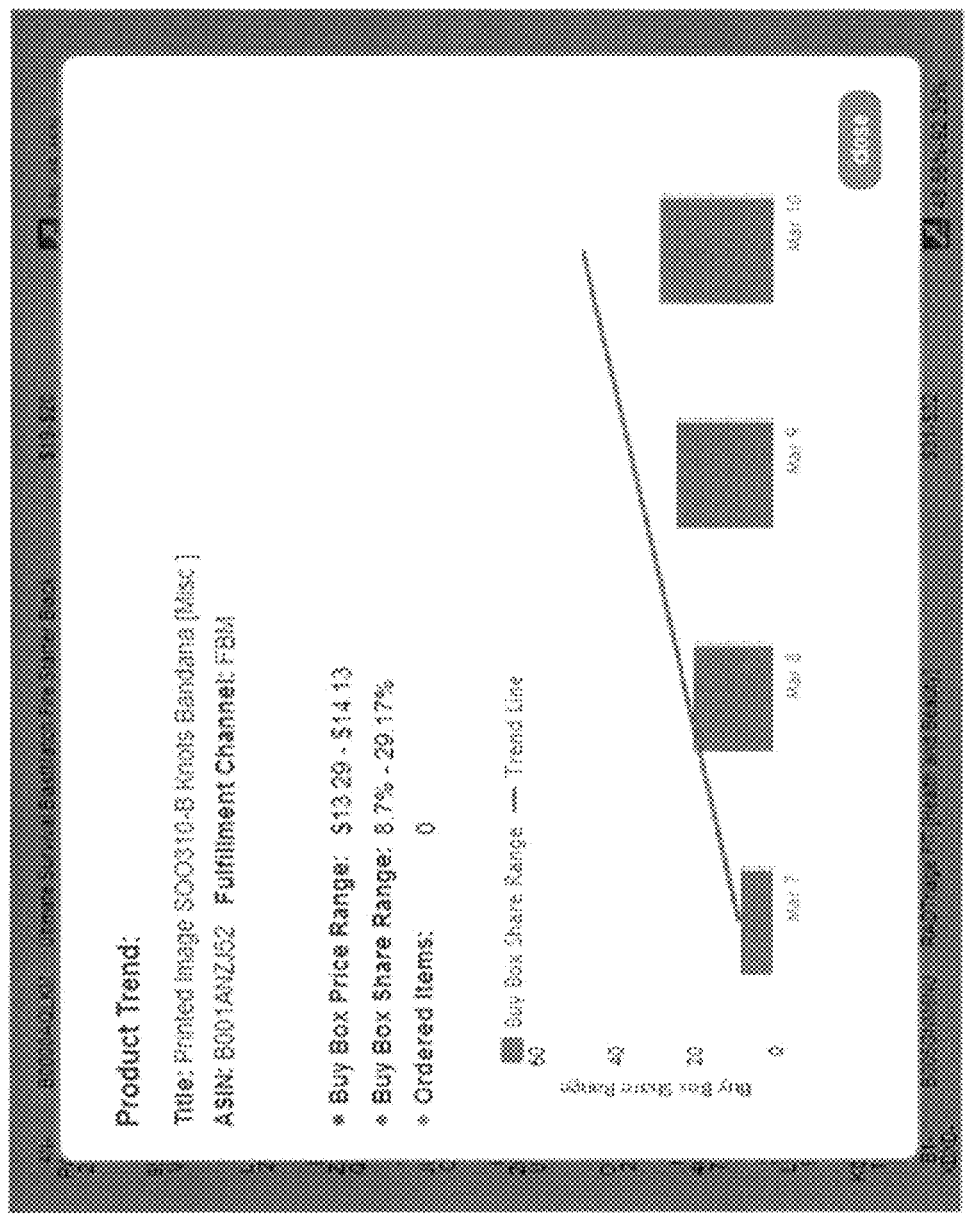
FIG. 8 is a screen capture of an exemplary trend summary of an item buy box share as presented by an exemplary user interface of an exemplary re-pricing system, according to some embodiment of the present invention.

Reference is now made to FIG. 8 which is a screen capture of an exemplary trend summary of an item buy box share as presented by an exemplary user interface of an exemplary re-pricing system, according to some embodiment of the present invention. The screen capture 800 presents to the seller 101 an overview of a trend of buy box share won by an offer of the seller 101 on the electronic marketplace 102 over a pre-define period. The time period over which the trend information is presented may be adjusted by the seller 101.

Figure 9:
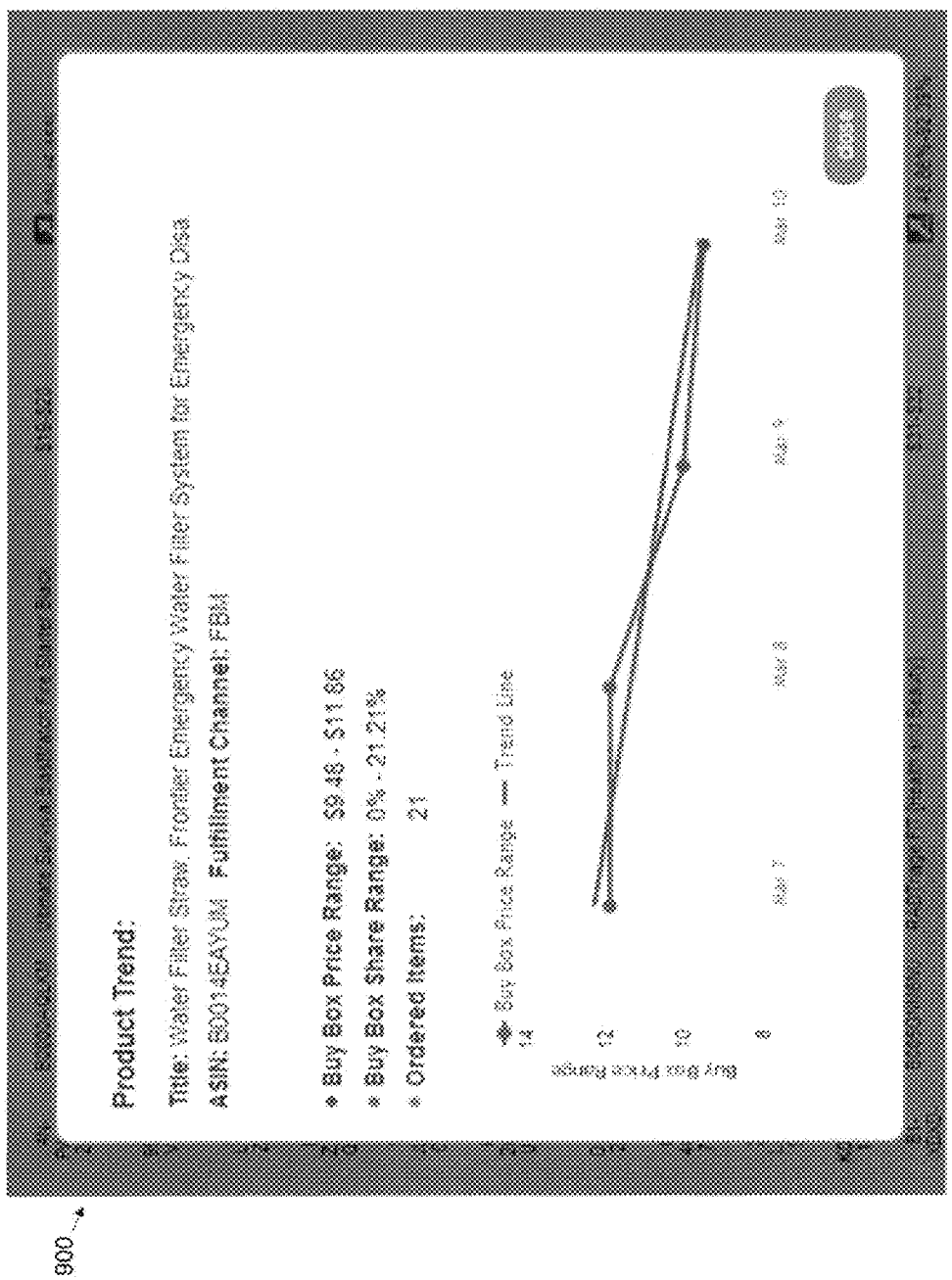
FIG. 9 is a screen capture of an exemplary product trend summary of an item buy box price as presented by an exemplary user interface of an exemplary re-pricing system, according to some embodiment of the present invention.

Reference is now made to FIG. 9 which is a screen capture of an exemplary product trend summary of an item buy box price as presented by an exemplary user interface of an exemplary re-pricing system, according to some embodiment of the present invention. The screen capture 900 presents to the seller 101 an overview of a trend of an item buy box price on the electronic marketplace 102 over a pre-define period. The time period over which the trend information is presented may be adjusted by the seller 101.

Figure 10:
FIG. 10 is a screen capture of an exemplary alerts summary as presented by an exemplary user interface of an exemplary re-pricing system, according to some embodiment of the present invention.

Reference is now made to FIG. 10 which is a screen capture of an exemplary alerts summary screen as presented by an exemplary user interface of an exemplary re-pricing system, according to some embodiment of the present invention. The screen capture 1000 presents to the seller 101 an overview of alerts generated in response to a plurality of pre-defined events with respect to offers on the electronic marketplace 102. The events may be set through default settings of the re-pricing system 100 and/or the alerts may be set by the seller 101. The alerts are associated with an item and may be prioritized in a severity level and may include additional information, for example, type of alert event, number of transactions made with respect to the item, inventory level and/or recommendation for actions in response to the alert. The seller 101 may click on one or more of the presented items to receive additional information relating to the alert event. The seller 101 may adjust the number of alerts to be presented on screen.

Figure 11:
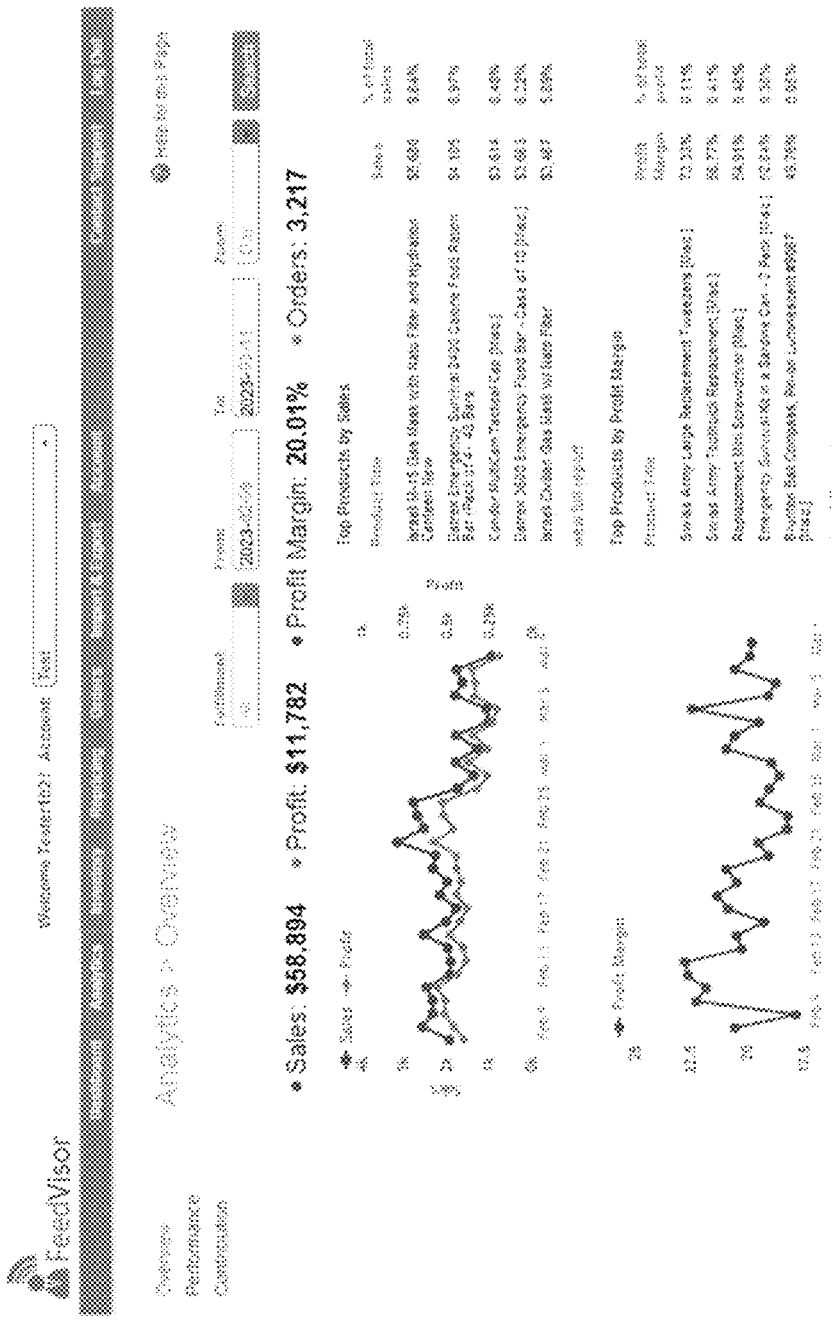
FIG. 11 is a screen capture of an exemplary commerce information summary of item sales on a selected channel as presented by an exemplary user interface of an exemplary re-pricing system, according to some embodiment of the present invention.

Reference is now made to FIG. 11 which is a screen capture of an exemplary commerce information summary of items sales on a selected channel as presented by an exemplary user interface of an exemplary re-pricing system, according to some embodiment of the present invention. The screen capture 1100 presents to the seller 101 an overview of items sales on a selected channel (electronic marketplace 102), for example, Amazon Marketplace and/or eBay. The commerce information may include, for example, commerce information graphs, profit information graphs, profit margin information graph, overall sales, overall profit, average profit margins and/or overall orders made to the item. The seller 101 may adjust the number of items to be presented on screen. In addition top products are presented from various perspectives, for example sales perspective and/or profit margin perspective. The Seller may set the time period for which the information is presented.

Figure 12:
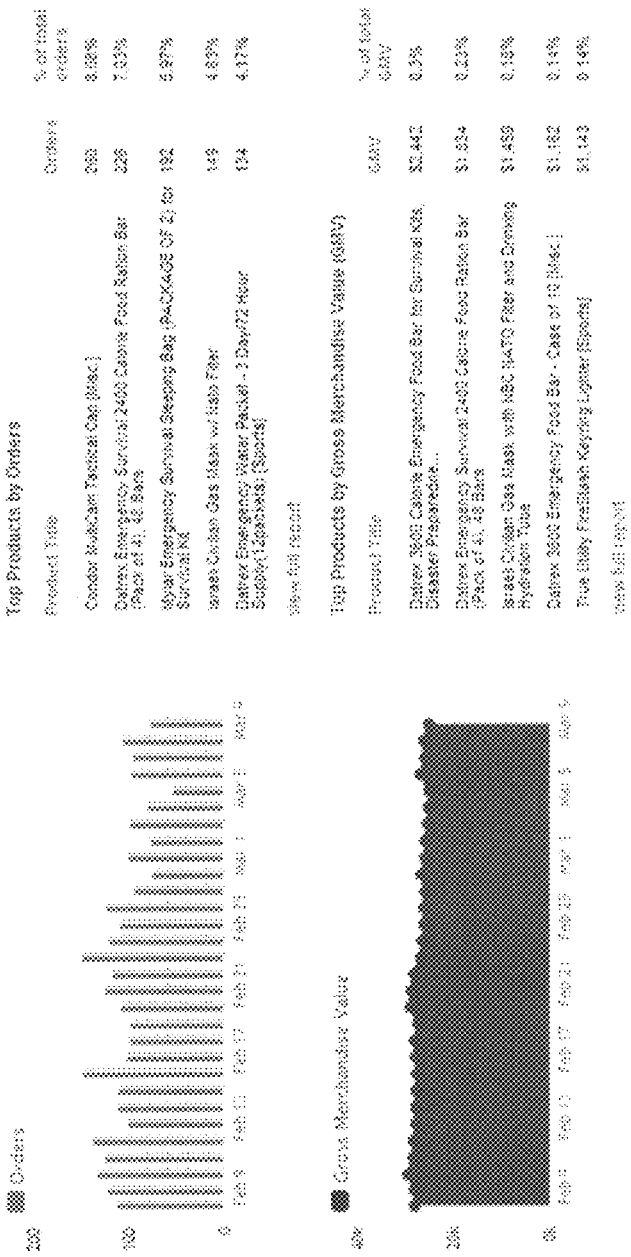
FIG. 12 is a screen capture of continuation of an exemplary commerce information summary items sales on a selected channel as presented by an exemplary user interface of an exemplary re-pricing system, according to some embodiment of the present invention.

Reference is now made to FIG. 12 which is a screen capture of continuation of an exemplary commerce information summary of items sales on a selected channel as presented by an exemplary user interface of an exemplary re-pricing system, according to some embodiment of the present invention. The screen capture 1100 is a continuation of screen capture 1200. The screen capture 1010 may include, for example, overall number of orders, percentage of orders made to the seller 101 out of all orders made for the items and/or the gross value of the merchandize. In addition top products are presented from various perspectives, for example, orders perspective and/or gross merchandise volume (GMV) perspective. The Seller may set the time period for which the information is presented.

Figure 13:
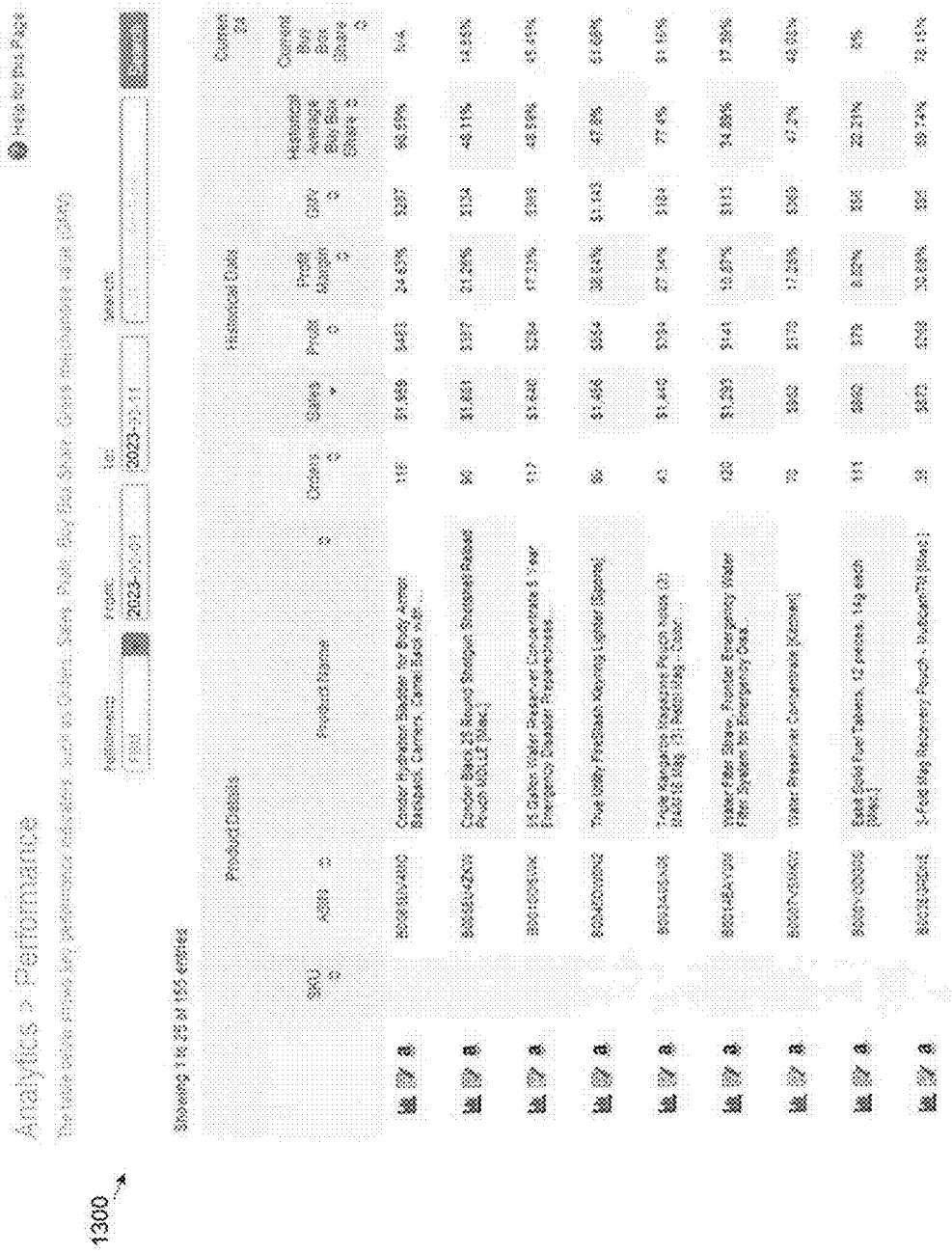
FIG. 13 is a screen capture of an exemplary performance overview of item as presented by an exemplary user interface of an exemplary re-pricing system, according to some embodiment of the present invention.

Reference is now made to FIG. 13 which is a screen capture of an exemplary performance overview of item as presented by an exemplary user interface of an exemplary re-pricing system, according to some embodiment of the present invention. The screen capture 1300 presents to the seller 101 the performance of a plurality of items offered for sale on the electronic marketplace 102. Performance information may include, for example, number of orders, sales volume, profit value and/or profit margin. The seller 101 may set the time period over which the performance of the items is presented.

Figure 14:
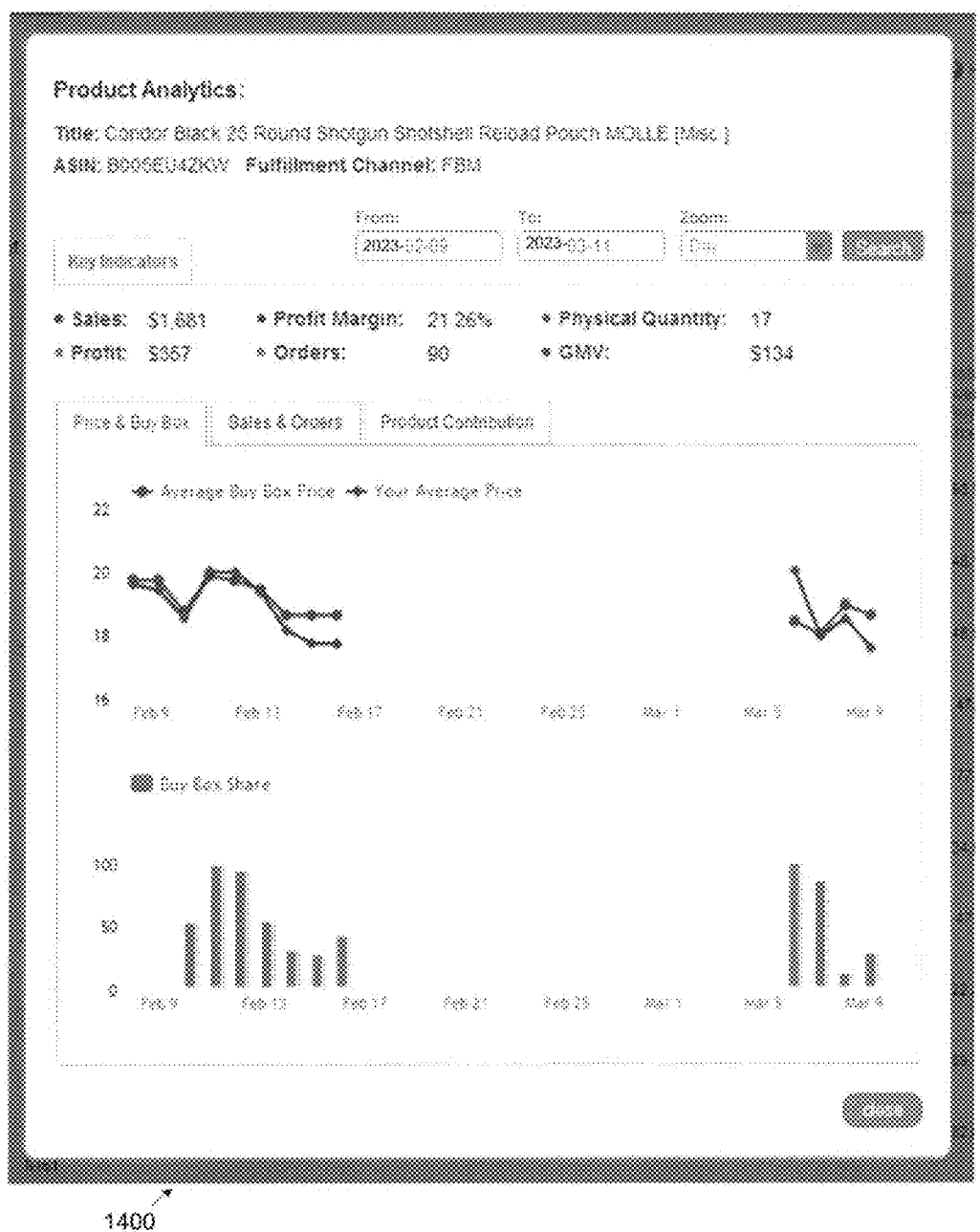
FIG. 14 is a screen capture of price and buy box tab of an exemplary product analysis summary as presented by an exemplary user interface of an exemplary re-pricing system, according to some embodiment of the present invention.

Reference is now made to FIG. 14 which is a screen capture of price and buy box tab of an exemplary product analysis summary as presented by an exemplary user interface of an exemplary re-pricing system, according to some embodiment of the present invention. The screen capture 1400 presents to the seller 101, for example, average buy box price for a specific item and/or average price in which the specific item was offered by the seller 101. The seller 101 may set the time period over which the performance of the items is presented.

Figure 15:
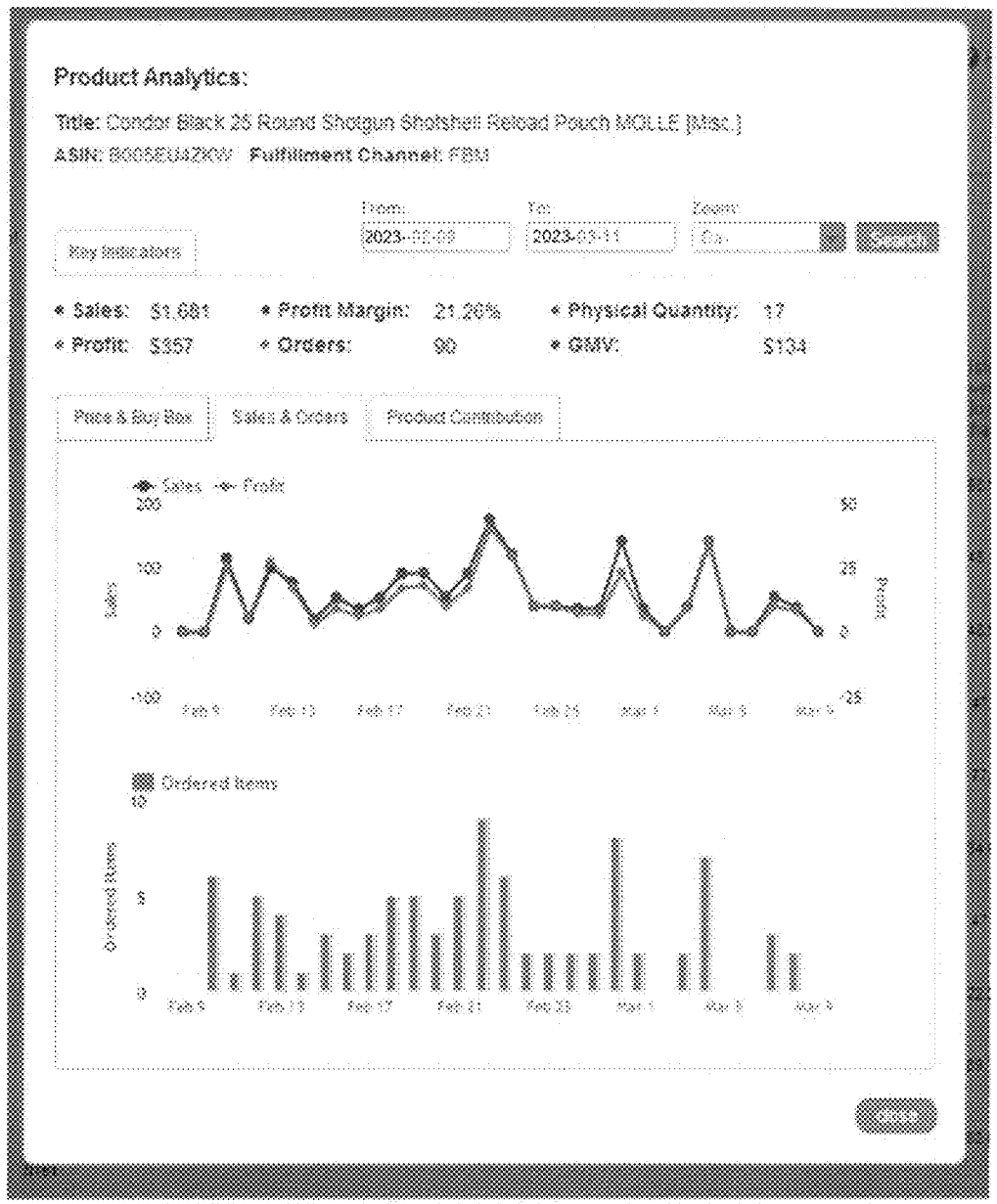
FIG. 15 is a screen capture of sales and orders tab of an exemplary product analysis summary as presented by an exemplary user interface of an exemplary re-pricing system, according to some embodiment of the present invention.

Reference is now made to FIG. 15 which is a screen capture of sales and orders tab of an exemplary product analysis summary as presented by an exemplary user interface of an exemplary re-pricing system, according to some embodiment of the present invention. The screen capture 1500 presents to the seller 101 commerce information as distributed over a period, for example, sales distribution over a time period, profit distribution over a time period and/or orders made over a time period. The seller 101 may set the time period over which the performance of the items is presented.

Figure 16:
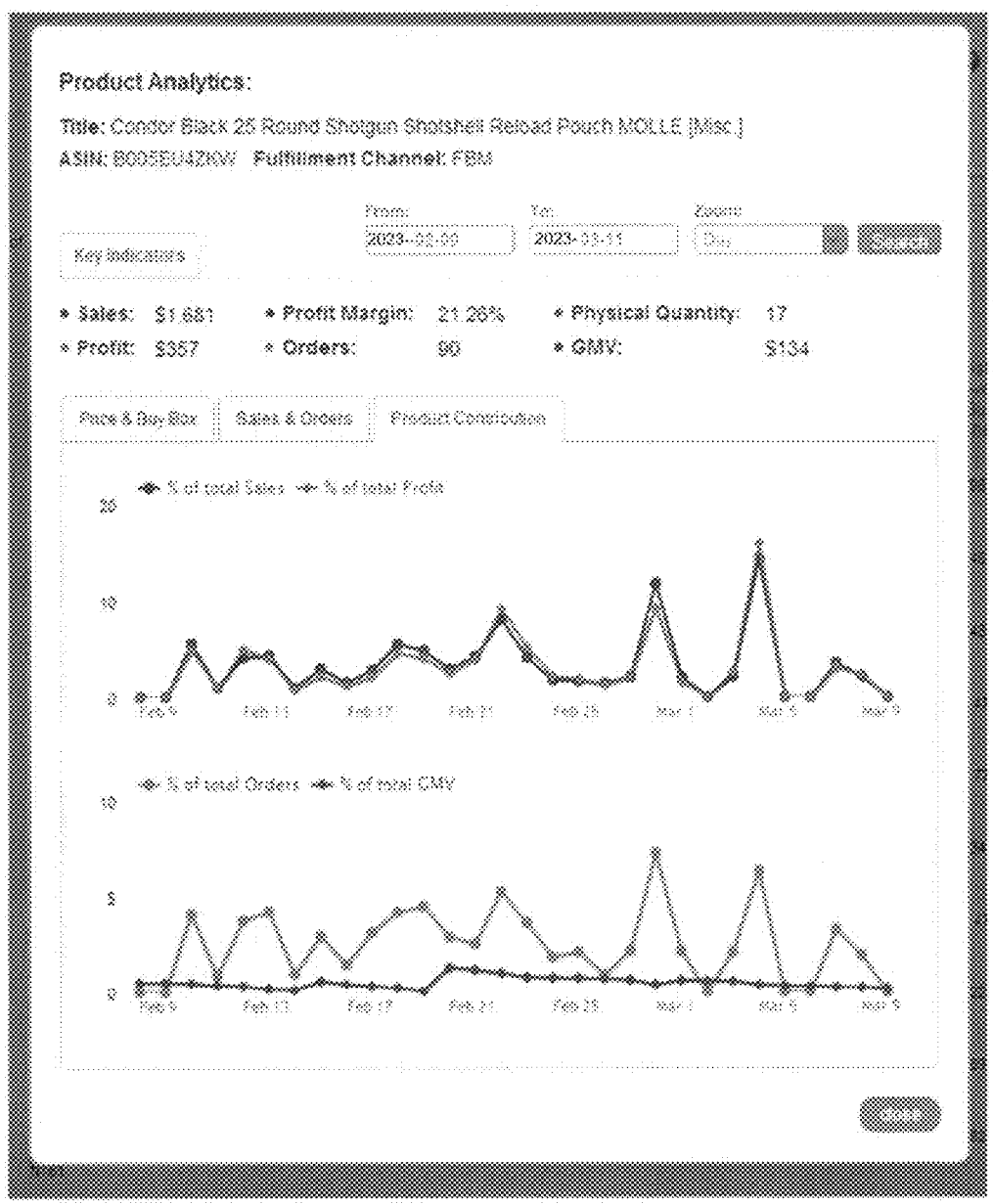
FIG. 16 is a screen capture of product contribution tab of an exemplary product analysis summary as presented by an exemplary user interface of an exemplary re-pricing system, according to some embodiment of the present invention.

Reference is now made to FIG. 16 which is a screen capture of product contribution tab of an exemplary product analysis summary as presented by an exemplary user interface of an exemplary re-pricing system, according to some embodiment of the present invention. The screen capture 1600 presents to the seller 101 the contribution of a specific item to the overall revenues of the portfolio of the seller 101, for example, total sales value, total profit value, percentage of the specific item orders out of the portfolio orders and/or percentage of revenues of the specific item out of the GMV of the seller 101. The seller 101 may set the time period over which the performance of the items is presented.

Figure 17:
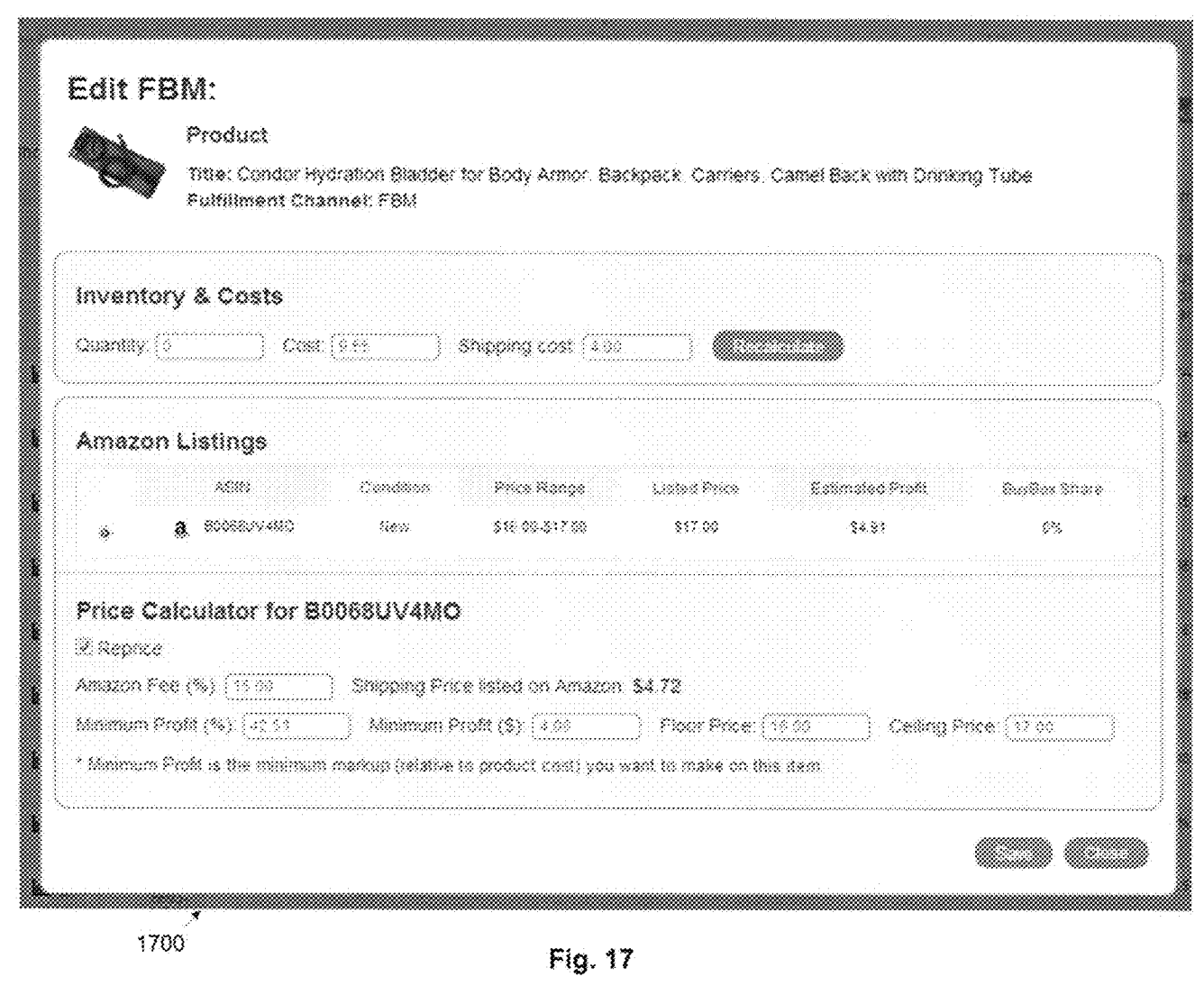

Reference is now made to FIG. 17 which is a screen capture of an exemplary editing screen of an exemplary user interface for inserting an item to an exemplary re-pricing system, according to some embodiment of the present invention. The screen capture 1700 is used by the seller 101 to edit an item offered for sale on the electronic marketplace 102 using the re-pricing system 100. Editing may include inserting a new item offered for sale into the re-pricing system 100. The screen provides the seller 101 a plurality of options for characterizing the item and/or the arena in which the item is offered, for example, item costs, inventory level, shipping costs, desired electronic marketplace, electronic marketplace fee, minimum profit (in percents), minimum profit (in currency) and/or price boundaries (floor price and/or ceiling price). The price boundaries are typically set by the re-pricing system 100, however the seller 101 may override them.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term commerce information and price is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer-implemented method of dynamically re-pricing items offered for sale on an electronic marketplace or an online store, the method executed by a re-pricing system comprising at least one processing unit and one or more software modules configured and operable to communicate data with said electronic marketplace or online store, the method comprising:

receiving, at a user interface module, from a client terminal of a seller, parameters defining goals of a sale policy for sale of at least one item in said electronic marketplace or online store:

creating, at a state machine module, a state machine configured and operable to execute said sale policy by causing an adjustment to a price of said at least one item, wherein the creating further includes automatically determining by the state machine module, an aggressiveness level based on the parameters defining goals of said sale policy, wherein the aggressiveness level controls a rate of said state machine in causing said adjustment to said price to achieve the sale goals defined in said sale policy;

monitoring in real time, by the monitor module, a plurality of prices given to said at least one item in said electronic marketplace or online store and generating preliminary commerce data indicative thereof, said monitoring being performed within a time period derived from said automatically determined aggressiveness level;

analyzing, at an analysis module, the preliminary commerce data and dynamically producing a plurality of price setting rules including automatically adjusting at least one of said plurality of price setting rules based on said analysis of the preliminary commerce data to adapt the at least one of the price setting rules to changing trade in the electronic marketplace or online store dynamically in real time and ensure that price adjustments occur within the parameters defining goals of the sale policy, the analysis module evaluating the parameters defining goals of the sale policy with respect to the preliminary commerce information to generate rule selection criteria and at least one data input requirement for adjusting the at least one of the price setting rules, said analyzing being performed using the preliminary commerce data generated within the time period derived from said automatically determined aggressiveness level;

monitoring, by the monitoring module, prices given to said at least one item in said electronic marketplace or online store, to generate current commerce data;

responsive to the aggressiveness level, the rules selection criteria, and the current commerce data, executing said state machine by the state machine module to select at least one of said plurality of price setting rules, adjusted based on analysis of the preliminary commerce data and calculate a new price for said at least one item in said electronic marketplace or online store using the adjusted at least one of said price setting rules;

responsive to the aggressiveness level, controlling, by the state machine, a rate of adjustment of said price to achieve the sale goals defined in said sale policy by adjusting the at least one data input requirement for implementing a price adjustment to the calculated new price by the state machine, the at least one data input requirement including at least one of a time period allocated for collecting commerce data, an amount of commerce data analyzed, an amount of commerce data required for statistical analysis, and a scope of statistical analysis;

implementing, by the state machine, a price adjustment of the at least one item from a current price to the new calculated price responsive to analysis of commerce data meeting the adjusted at least one data input requirement.

2. The method of claim 1, wherein said sale policy includes a traffic strategy and wherein the method comprises increasing overall traffic from at least one traffic generator to the electronic marketplace or online store based on said traffic strategy.

3. The method of claim 1, comprising translating said sale policy into a sale strategy implemented through said plurality of price setting rules, wherein execution of said at least one selected price setting rule fulfills the goals of said sale policy.

4. The method of claim 3, comprising using said sale strategy for resolving conflicts between said plurality of price setting rules.

5. The method of claim 1, wherein the determining of said new price comprises performing a plurality of re-pricing iterations within the time periods derived from the respectively defined aggressiveness levels, generating and analyzing during each said re-pricing iteration performed within its respective derived time period new instances of said commerce data in order to automatically adjust at least one of said plurality of price setting rules and said aggressiveness level based on said new instances of said commerce data, and executing said state machine according to the respective aggressiveness level defined to select at least one price setting rule for the determining of a new price for the at least one item.

6. The method of claim 1, wherein said commerce data includes previous commerce data of said at least one item collected in the past.

7. The method of claim 1, wherein said commerce data includes at least one member of a group consisting of: sale transactions of said at least one item, at least one vendor associated with the at least one item, prices set by said at least one vendor, views of said at least one item, ranking of offer made by said seller, ranking of offers made by said at least one vendor, inventory level, shipping information of said at least one vendor, terms of payment of said at least one vendor, consumers rating of said seller and consumers rating of said at least one vendor.

8. The method of claim 1, wherein said commerce data includes traffic generated by each of respective traffic generators to the electronic marketplace or online store.

9. The method of claim 1, wherein the analyzing of said commerce data includes determining a contribution of each of a plurality of traffic generators in producing orders for the at least one item, and wherein dynamically adjusting the plurality of price setting rules comprises dynamically adjusting the plurality of price setting rules to increase overall traffic from said plurality of traffic generators.

10. The method of claim 1, wherein said sale policy includes a plurality of sale parameters which are defined using a range of values in order to allow flexibility in adjusting said price.

11. The method of claim 1, comprising dictating based on said aggressiveness level the extent of the analysis required for adjusting the plurality of price setting rules for the determining of said price, and modifying the sale policy based on said analysis.

12. The method of claim 1, comprising dictating based on said aggressiveness level a price adjusting amount for the determining of said new price.

13. The method of claim 1, comprising presenting in said client terminal said commerce data to said seller for allowing said seller to analyze said commerce data of said at least one item and for adjusting the sale policy accordingly.

14. The method of claim 1, comprising manually adjusting at least one of said plurality of price setting rules by said seller via said client terminal.

15. The method of claim 1, comprising performing extrapolation over a plurality of price levels points adjacent to a price of the at least one item in order to enhance statistical information used by said analysis.

16. The method of claim 1, comprising setting priority between at least two items offered for sale by said seller, said priority defines the frequency in which said price is set for said at least two items.

17. The method of claim 1, wherein the analyzing comprises carrying out trade off analysis to evaluate at least two pricing alternatives in order to select a pricing alternatives that best achieves goals set by said sale policy.

18. The method of claim 1, wherein said sale policy is a long term policy, and wherein the method comprising setting and fulfilling at least one intermediate goal while executing said long term policy in order to fulfill the goals of said sale policy.

19. The method of claim 1, comprising predicting said sale policy, and wherein the dynamic adjusting of said plurality of price setting rules comprises dynamically adjusting said plurality of price setting rules according to analysis of said prediction of said sale policy.

20. The method of claim 19, comprising determining said predicted sale policy based on a correlation between at least one intermediate metric and said sale policy.

21. The method of claim 20, wherein said at least one intermediate metric includes at least one member of a group consisting of: competition for said at least one item, top rank rate of said seller for said at least one item, price of said at least one item, demand denoting popularity and purchase levels of said at least one item, traffic for said at least one item from a respective traffic generator, conversion rates for said at least one item from said respective traffic generator.

22. The method of claim 19, further comprising calculating at least one intermediate metric for said at least one item for a selected current or previous time period to estimate a baseline level of said at least one intermediate metric.

23. The method of claim 19, further comprising predicting at least one intermediate metric for said at least one item for a selected future time period.

24. The method of claim 19, comprising determining at least one intermediate metric for said at least one item.

25. The method of claim 19, further comprising calculating a statistical significance level reflecting a probability of said predicting of at least one intermediate metrics and/or a probability of said predicting said sale policy.

26. The method of claim 19, wherein predicting said sale policy comprises predicting at least one metric associated with said sale policy.

27. The method of claim 26, wherein said at least one metric associated with said sale policy includes at least one member of a group consisting of: revenue, profit, and margin.

28. A re-pricing system for dynamically re-pricing items offered for sale on an electronic marketplace or an online store, wherein said system comprises:
- at least one processor configured and operable to communicate data with said electronic marketplace or online store over a data network; and
- one or more computer-readable media storing computer-executable modules comprising:
- an input module configured and operable to communicate with a client terminal and receive therefrom parameters defining goals of a sale policy for at least one item offered for sale on said electronic marketplace or online store, said at least one processing unit configured to automatically determine an aggressiveness level based on the parameters defining goals of said sale policy;
- a monitor module configured and operable to communicate data with said electronic marketplace or online store for monitoring, in real time within a time period derived from said automatically determined aggressiveness level, a plurality of prices given to said at least one item in said electronic marketplace or online store and generating preliminary commerce data indicative thereof, and thereafter to monitor prices given to said at least one item in said electronic marketplace or online store, to generate current commerce data;
- an analysis module configured and operable to analyze the preliminary commerce data and dynamically produce a plurality of price setting rules accordingly, including automatically adjusting at least one of said plurality of price setting rules based on said preliminary commerce data to adapt the at least one of the price setting rules to changing trade in the electronic marketplace or online store dynamically in real time and ensure that price adjustments occur within the parameters defining goals of the sale policy, the analysis module evaluating the parameters defining goals of the sale policy with respect to the preliminary commerce information to generate rule selection criteria and at least one data input requirement for adjusting the at least one of the price setting rules, said analyzing being performed using the preliminary commerce data generated within the time period derived from said automatically determined aggressiveness level; and
- a state machine module configured and operable, responsive to the aggressiveness level, the rules selection criteria, and the current commerce data, to select at least one of said plurality of price setting rules, adjusted based on the analysis of the preliminary commerce data and cause an adjustment to a price from a current price to a new calculated price for said at least one item in said electronic marketplace or online store using the adjusted at least one of said price setting rules; wherein, responsive to the aggressiveness level, the state machine controls a rate of adjustment of said price to achieve the sale goals defined in said sale policy by adjusting the at least one data input requirement for price adjustment by a state machine created by the state machine module, including at least one of a time period allocated for collecting the commerce data, an amount of commerce data analyzed, an amount of commerce data required for statistical analysis, and a scope of statistical analysis for adjusting the least one of the plurality of price setting rules; the state machine implementing the price adjustment of the at least one item from the current price to the new calculated price responsive to analysis of commerce data meeting the adjusted at least one data input requirement.

29. The re-pricing system of claim 28, comprising an output module configured and operable to present in the client terminal said commerce data, and wherein said commerce data is analyzed by said analysis module to adjust said plurality of price setting rules or the sale policy.

30. The re-pricing system of claim 29, wherein said output module is configured and operable to present said plurality of price setting rules in the client terminal to allow adjusting of at least one of said plurality of price setting rules.

31. The re-pricing system of claim 28, wherein said input module is configured and operable to communicate with a client application operating in said client terminal.

32. The re-pricing system of claim 31, wherein said client application is implemented through a web based service which is accessible through said client terminal.

33. The re-pricing system of claim 28, wherein said analysis module is configured and operable to dynamically adjust the plurality of price setting rules according to analysis of a prediction of said sale policy for said at least one item based on said commerce data.

34. The re-pricing system of claim 33, wherein said prediction of said sale policy is based on correlation with a prediction of at least one intermediate metric, said intermediate metric includes at least one member of a group consisting of: competition for said at least one item, top rank rate of said seller for said at least one item, price of said at least one item, and demand denoting popularity and purchase levels of said at least one item.

35. The re-pricing system of claim 28 wherein the at least one processing unit is configured and operable to adjust a price amount unit defining size of steps for adjusting the price of the at least one item.

36. A computer-implemented method of dynamically re-pricing items offered for sale on an electronic marketplace or an online store, the method executed by a re-pricing system comprising at least one processing unit and one or more software modules configured and operable to communicate data with said electronic marketplace or online store, the method comprising:
(a) receiving, at a user interface module, from a client terminal, parameters defining goals of a sale policy for sale of at least one item in said electronic marketplace or online store;
(b) creating, at a state machine module, a state machine configured and operable to execute said sale policy by causing an adjustment to a price of said at least one item, wherein the creating further includes automatically determining by the state machine module, an aggressiveness level based on the parameters defining goals of said sale policy, wherein the aggressiveness level controls a rate of causing said adjustment to said price to achieve the sale goals;
(c) monitoring in real time, by the monitor module, a plurality of prices given to said at least one item in said electronic marketplace or online store and generating preliminary commerce data indicative thereof, said monitoring being performed within a time period derived from the aggressiveness level;
(d) analyzing, at an analysis module, the preliminary commerce data and dynamically producing a plurality of price setting rules including automatically adjusting at least one of said plurality of price setting rules based on said analysis of the preliminary commerce data to adapt the at least one of the price setting rules to changing trade in the electronic marketplace or online store dynamically in real time and ensure that price adjustments occur within the parameters defining goals of the sale policy, the analysis module evaluating the parameters defining goals of the sale policy with respect to the preliminary commerce information to generate rule selection criteria and at least one data input requirement for adjusting the at least one of the price setting rules, said analyzing being performed using the preliminary commerce data generated within the time period derived from said aggressiveness level;

(e) automatically adjusting said aggressiveness level based on the analysis of the preliminary commerce data to achieve the goals of the sale policy;

(f) monitoring, by the monitoring module, prices given to said at least one item in said electronic marketplace or online store, to generate current commerce data;

(g) responsive to the aggressiveness level, the rules selection criteria, and the current commerce data, executing said state machine by the state machine module to select at least one of said plurality of price setting rules, adjusted based on the analysis of the preliminary commerce data and calculate a new price for said at least one item in said electronic marketplace or online store using the adjusted at least one of said price setting rules;

(h) controlling, by the state machine, based on the automatically defined aggressiveness level, a rate of said state machine in adjusting said price to achieve the sale goals defined in said sale policy by adjusting the at least one data input requirement for implementing a price adjustment to the calculated new price by the state machine, the at least one data input requirement including at least one of: a number of samples for the monitoring of the prices of the at least one item in the electronic marketplace or online store within the time period derived from said automatically defined aggressiveness level; a scope of statistical analysis; and a price amount unit defining size of steps taken based on an amount of data input analyzed for adjusting the price of the at least one item, (i) implementing, by the state machine, a price adjustment of the at least one item from a current price to the new calculated price responsive to analysis of commerce data meeting the adjusted at least one data input requirement; and repeating steps (b) to (i) accordingly.

37. The method of claim 36 comprising presenting in the client terminal the analysis of the commerce data by the analysis module to adjust at least one of the sale policy and the plurality of price setting rules.

* * * * *